US010436596B2

(12) United States Patent
Jackson et al.

(10) Patent No.: US 10,436,596 B2
(45) Date of Patent: *Oct. 8, 2019

(54) POINT-OF-INTEREST LATENCY PREDICTION USING MOBILE DEVICE LOCATION HISTORY

(71) Applicant: GOOGLE LLC, Mountain View, CA (US)

(72) Inventors: Dean Kenneth Jackson, Pittsburgh, PA (US); Daniel Victor Klein, Pittsburgh, PA (US)

(73) Assignee: GOOGLE LLC, Mountain View, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 15/236,373

(22) Filed: Aug. 12, 2016

(65) Prior Publication Data

US 2016/0349064 A1 Dec. 1, 2016

Related U.S. Application Data

(63) Continuation of application No. 14/644,982, filed on Mar. 11, 2015, now Pat. No. 9,470,538, which is a (Continued)

(51) Int. Cl.
*G01C 21/34* (2006.01)
*G01C 21/00* (2006.01)
(Continued)

(52) U.S. Cl.
CPC ........... *G01C 21/343* (2013.01); *G01C 21/00* (2013.01); *G01C 21/34* (2013.01);
(Continued)

(58) Field of Classification Search
CPC .. G01C 21/00; G01C 21/343; G01C 21/3679; G01C 21/34; G01C 21/3691; G01C 21/3617; H04W 4/029
See application file for complete search history.

(56) References Cited

U.S. PATENT DOCUMENTS 6,173,209 B1   1/2001   Laval et al.
8,150,741 B2   4/2012   Figueroa et al.
(Continued)

FOREIGN PATENT DOCUMENTS

KR   10-2012-0088746 A   10/2013
WO   2009/036844 A1   3/2009
(Continued)

OTHER PUBLICATIONS

"LineKing: Crowdsourced Line Wait-Time Estimation using Smartphones". University of Buffalo. Archived by Archive.org on Sep. 7, 2012. Accessed on Jan. 28, 2014. (Year: 2012).*
(Continued)

*Primary Examiner* — Jeffrey C Boomer
(74) *Attorney, Agent, or Firm* — Johnson, Marcou & Isaacs, LLC

(57) ABSTRACT

A latency analysis system determines a latency period, such as a wait time, at a user destination. To determine the latency period, the latency analysis system receives location history from multiple user devices. With the location histories, the latency analysis system identifies points-of-interest that users have visited and determines the amount of time the user devices were at a point-of-interest. For example, the latency analysis system determines when a user device entered and exited a point-of-interest. Based on the elapsed time between entry and exit, the latency analysis system determines how long the user device was inside the point-of-interest. By averaging elapsed times for multiple user devices, the latency analysis system determines a latency period for the point-of-interest. The latency analysis system then uses the latency period to provide latency-based recommendations to a user. For example, the latency analysis system may determine a shopping route for a user.

18 Claims, 8 Drawing Sheets

Related U.S. Application Data continuation of application No. 14/060,337, filed on Oct. 22, 2013, now Pat. No. 9,329,047.

(60) Provisional application No. 61/847,431, filed on Jul. 17, 2013.

(51) Int. Cl.
*H04W 4/029* (2018.01)
*G01C 21/36* (2006.01)

(52) U.S. Cl.
CPC ..... *G01C 21/3617* (2013.01); *G01C 21/3679* (2013.01); *G01C 21/3691* (2013.01); *H04W 4/029* (2018.02)

(56) References Cited

U.S. PATENT DOCUMENTS

| | | | |
|---|---|---|---|
| 8,606,517 | B1 | 12/2013 | Ehrlacher et al. |
| 9,329,047 | B2 | 5/2016 | Jackson et al. |
| 9,470,538 | B2 | 10/2016 | Jackson et al. |
| 2002/0174021 | A1* | 11/2002 | Chu .................. G06Q 10/063 705/7.11 |
| 2007/0130026 | A1 | 6/2007 | O'Pray et al. |
| 2007/0191026 | A1 | 8/2007 | Teplitsky |
| 2008/0103686 | A1 | 5/2008 | Alberth et al. |
| 2008/0267107 | A1 | 10/2008 | Rosenberg |
| 2009/0319306 | A1 | 12/2009 | Chanick |
| 2010/0106662 | A1 | 4/2010 | Ramaswamy |
| 2010/0211308 | A1 | 8/2010 | Zheng et al. |
| 2011/0144903 | A1 | 6/2011 | Gupta et al. |
| 2011/0178701 | A1 | 7/2011 | Gupta et al. |
| 2011/0184743 | A1 | 7/2011 | Trollman |
| 2011/0225068 | A1* | 9/2011 | Figueroa ........... G06F 17/30241 705/27.1 |
| 2011/0276385 | A1 | 11/2011 | Keller |
| 2011/0313657 | A1 | 12/2011 | Myllymaki et al. |
| 2012/0143720 | A1 | 6/2012 | Moser |
| 2013/0166332 | A1 | 6/2013 | Hammad |
| 2013/0191193 | A1 | 7/2013 | Calman et al. |
| 2013/0218912 | A1 | 8/2013 | Howard et al. |
| 2013/0267255 | A1 | 10/2013 | Liu et al. |
| 2014/0046789 | A1 | 2/2014 | Baliga |
| 2014/0163934 | A1 | 6/2014 | Zhang et al. |
| 2014/0180848 | A1* | 6/2014 | Argue ................. G07G 1/0036 705/16 |
| 2014/0257914 | A1 | 9/2014 | Calman et al. |
| 2015/0026006 | A1 | 1/2015 | Jackson et al. |
| 2015/0310434 | A1 | 10/2015 | Cheung |

FOREIGN PATENT DOCUMENTS

| | | |
|---|---|---|
| WO | 2011/072753 A1 | 6/2011 |
| WO | 2015/009966 A1 | 1/2015 |

OTHER PUBLICATIONS

Boomer, "U.S. Office Action issued in copending U.S. Appl. No. 14/060,337, filed Oct. 22, 2013", dated Mar. 17, 2014, 15 pages.

Boomer, "U.S. Office Action issued in copending U.S. Appl. No. 14/060,337, filed Oct. 22, 2013", dated Feb. 6, 2015, 16 pages.

Boomer, "U.S. Office Action issued in copending U.S. Appl. No. 14/060,337, filed Oct. 22, 2013", dated Sep. 10, 2014, 17 pages.

Bulut, et al., "LineKing: Crowdsourced Line Wait-Time Estimation using Smartphones", Sep. 7, 2012, 20 pages.

Lee, "International Search Report and Written Opinion issued in International Application No. PCT/US2014/047091", dated Nov. 6, 2014, 10 pages.

Moon, "International Preliminary Report on Patentability issued in International Application No. PCT/US2014/047091", dated Jan. 28, 2016, 9 pages.

Shah, "U.S. Office Action issued in copending U.S. Appl. No. 14/060,357, filed Oct. 22, 2013", dated Jan. 28, 2014, 14 pages.

Shah, "U.S. Office Action issued in copending U.S. Appl. No. 14/060,357, filed Oct. 22, 2013", dated Jun. 23, 2014, 16 pages.

Shah, "U.S. Office Action issued in copending U.S. Appl. No. 14/060,357, filed Oct. 22, 2013", dated Dec. 26, 2014, 21 pages.

* cited by examiner

300

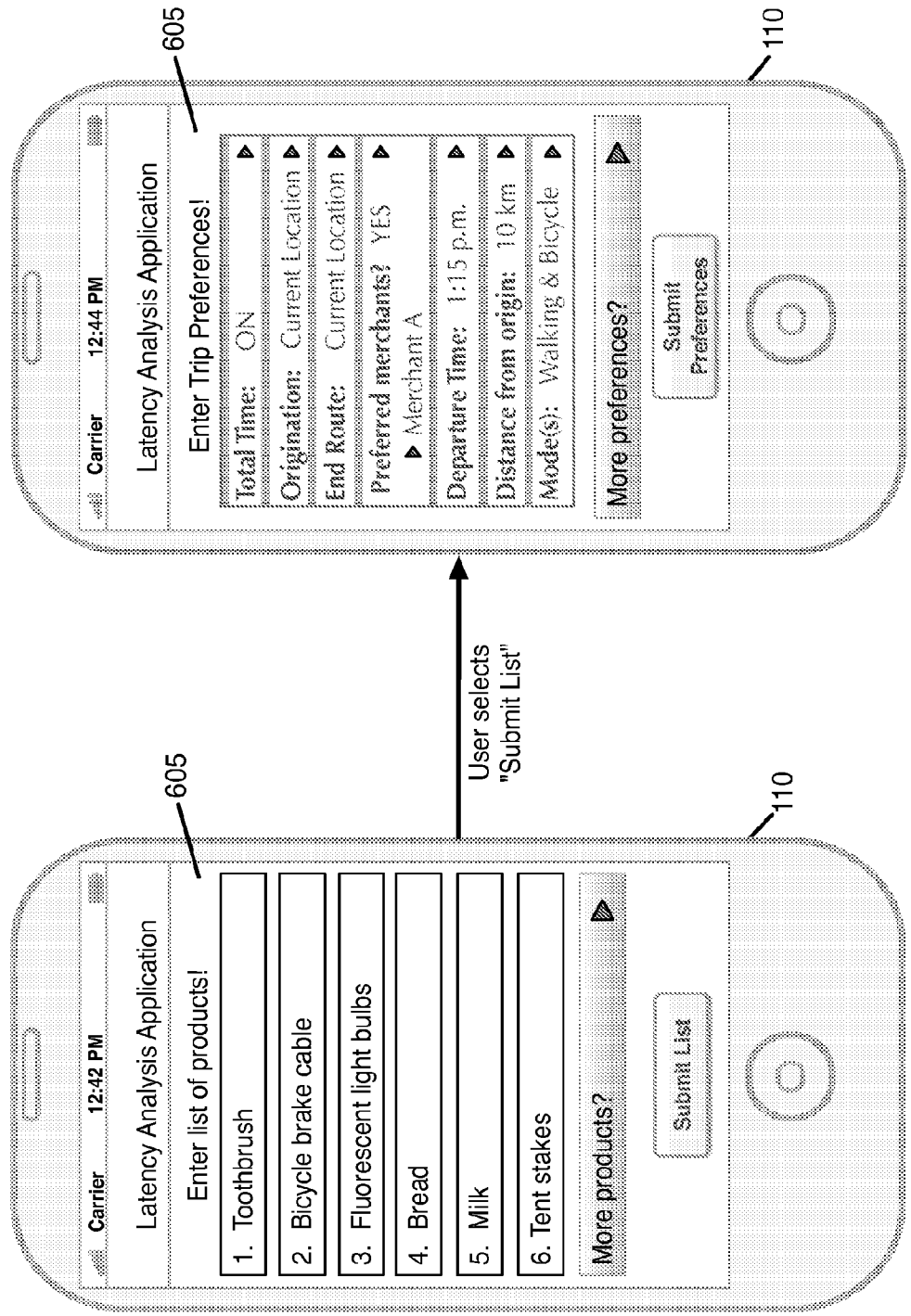

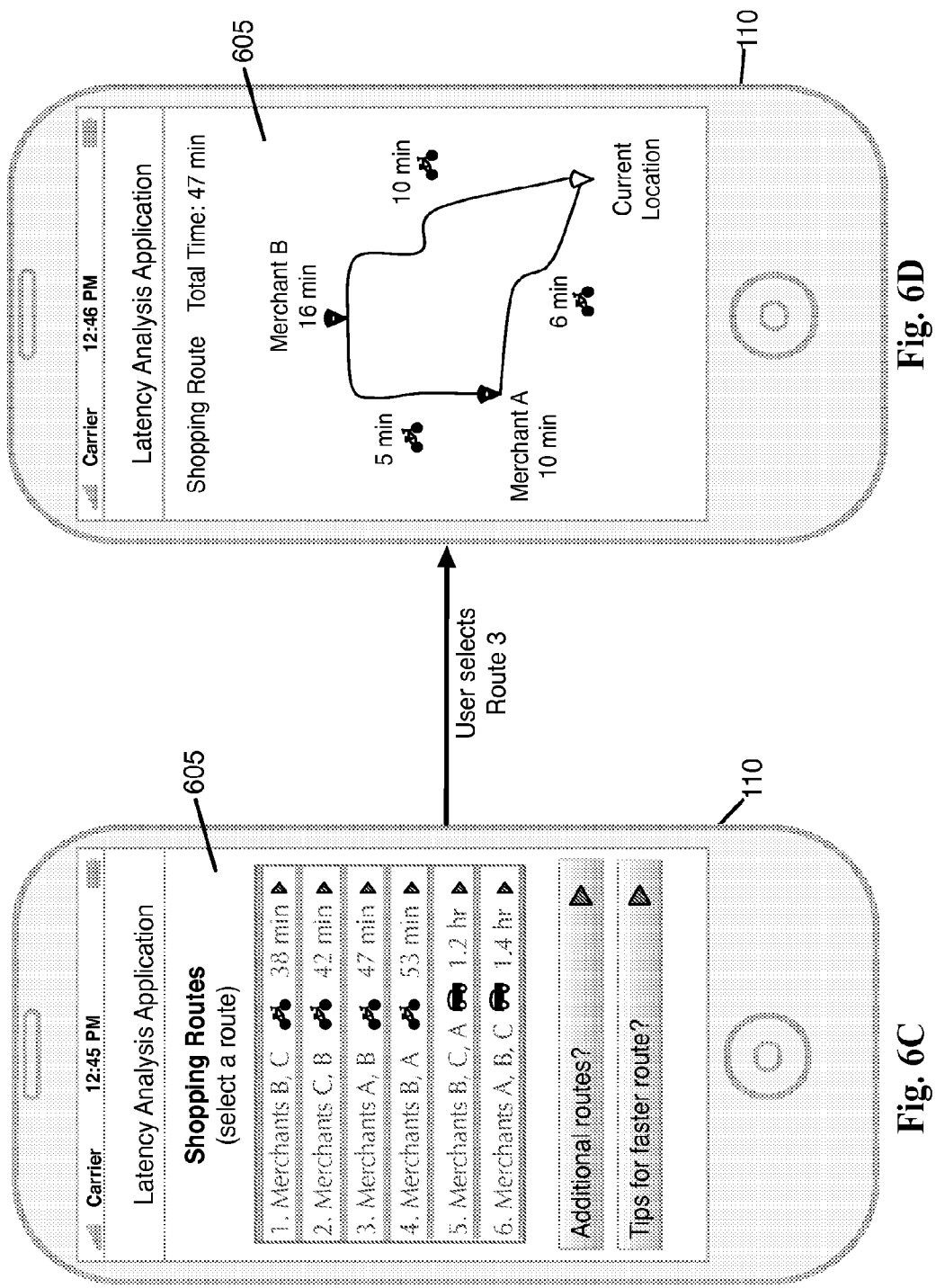

POINT-OF-INTEREST LATENCY PREDICTION USING MOBILE DEVICE LOCATION HISTORY

CROSS-REFERENCE TO RELATED APPLICATIONS

This patent application is a continuation of and claims priority to U.S. Non-Provisional patent application Ser. No. 14/644,982, filed Mar. 11, 2015, and entitled "Point-of-Interest Latency Prediction Using Mobile Device Location History," which is a continuation of and claims priority to U.S. Non-Provisional patent application Ser. No. 14/060,337, filed Oct. 22, 2013, and entitled "Point-of-Interest Latency Prediction Using Mobile Device Location History," which claims priority to U.S. Provisional Patent Application No. 61/847,431, filed Jul. 17, 2013, and entitled "Point-of-Interest Latency Prediction Using Mobile Device Location History." The entire contents of each of the above-identified priority applications is hereby fully incorporated herein by reference.

TECHNICAL FIELD

The present disclosure relates generally to determining a latency period at a user destination, and more particularly to methods and systems that rely on user-location history, such as fine-grained user location data, to determine the latency period at a destination of a user. The present disclosure also relates to using latency period data in a variety of applications, including generation of a shopping route for a user.

BACKGROUND

When users plan a trip to a destination, such as to a grocery store, a retailer, a restaurant, or other point-of-interest, users often desire to know how long the trip to the destination will take. For example, a user searches for a particular restaurant or retail chain in a mapping application on a user device, such as a mobile phone. Based on the search criteria, the flapping application may return a travel distance and expected time to various locations of the restaurant or retailer chain. The mapping application may also highlight the chain location that is the closest to the user device. The mapping application may also provide recommended routes for the user to take to the closest chain location.

While knowing the travel time and distance to a location is often helpful to a user, the user is left without knowing how busy the nearest location is or whether other, nearby locations are less busy. For example, the user does not know whether visiting a chain location that is slightly further away—but less busy or less crowded—may take less time overall than visiting the chain location that is nearby. Thus, based on travel time to the destination alone, the user may spend more time traveling to and visiting the nearest location than the user would if traveling to and visiting a location that is further away. And in some instances, a user may not care how long it takes to get to a point-of-interest. Rather, the user may desire only to know how long the wait is at a particular point-of-interest or how long it will take the user to pass through the point-of-interest, such as through a checkout line at a retailer. In addition to knowing how long a trip will take, in certain instances a user may wish to know the fastest route or alternate routes. For example, a user with a specific shopping list may desire the best route (or alternate routes) for obtaining the products on the shopping list.

SUMMARY

In certain example aspects described herein, a computer-implemented method for latency determination for points-of-interest is provided. A latency analysis system receives a location history for multiple user computing devices. The location history comprises information identifying the locations for each of the user computing devices. The location history also comprises a time corresponding to when each of the user computing devices was at each location. Based on a match of the location for at least a portion of the user computing devices, the latency analysis system identifies a location of a point-of-interest from the location history received from the user computing devices.

For each of the of the user computing devices having a location corresponding to the location of the point-of-interest, the latency analysis system then determines a first time and a second time for the user computing device. The first time is associated with the user computing device arriving at the location of the point-of-interest and the second time is associated with the user computing device leaving the location of the point-of-interest. The latency analysis system then, for each of the user computing devices having a location corresponding to the location of the point-of-interest, compares the determined first time to the determined second time to determine a latency interval at the point-of-interest for each of the user computing devices having a location corresponding to the location of the point-of-interest. The latency analysis system then determines a latency period for the point-of-interest, the latency period being a function of each determined latency interval for the point-of-interest.

In certain example aspects, the latency analysis system also receives a request from a particular user computing device, the request relating to the determined latency period for the point-of-interest. In response to receiving the request from the particular user computing device, the latency analysis system communicates a response to the particular user computing device. The response comprises information derived from the determined latency period for the point-of-interest.

In certain other example aspects, a system for latency determination for points-of-interest is provided. Also provided in certain aspects is a computer program product to for latency determination for points of interest.

In certain example aspects described herein, a computer-implemented method for generating a shopping route, based on latency period information, is provided. The latency analysis system receives a shopping list for products from a user computing device. The latency analysis system then determines a location of the user computing device relative to merchants that offer the products for sale. The latency analysis system then determines a latency period associated with each of the merchants, the latency period corresponding to the amount of time to obtain one or more of the products on the shopping list from the merchant location.

In response to determining the latency period for each of the determined merchant locations, the latency analysis system determines a shopping route for the user to obtain the products on the shopping list. In certain aspects, the shopping route identifies at least a portion of the merchants offering the products for sale and results in a shortened total time period for the user to obtain the products on the shopping list from the merchants offering the products for sale. In certain example embodiments, the total time period includes travel time among the merchant locations that the user must visit to obtain the products on the shopping list.

In certain other example aspects, a system for generating a shopping route is provided. Also provided in certain aspects is a computer program product to for generating a shopping route.

These and other aspects, objects, features and advantages of the example embodiments will become apparent to those having ordinary skill in the art upon consideration of the following detailed description of illustrated example embodiments.

BRIEF DESCRIPTION OF THE DRAWINGS

FIGS. 6A through 6D are an illustration depicting a user interface for providing a shopping route to a user, in accordance with certain example embodiments.

DETAILED DESCRIPTION OF THE EXAMPLE EMBODIMENTS

Overview

Figure 1:
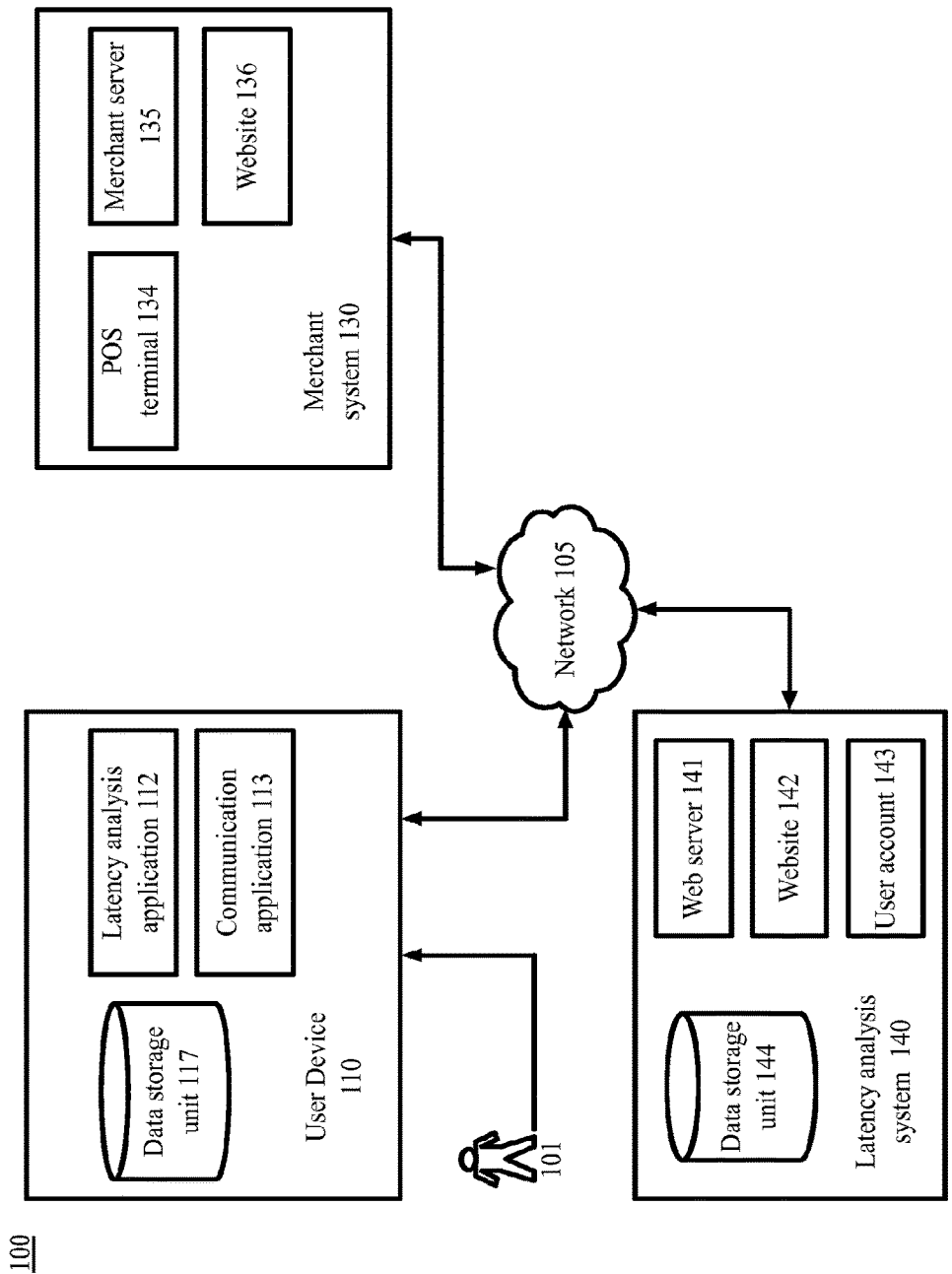
FIG. 1 is a block diagram depicting a system for determining a latency period for points-of-interest, in accordance with certain example embodiments.

As disclosed herein, a latency analysis system determines a latency period, such as a current wait time, at a destination of a user. To determine the latency period, the latency analysis system receives location history from multiple user devices. Based on the location histories, the latency analysis system identifies points-of-interest that users have visited and determines the amount of time the user devices were at a point-of-interest. For example, the latency analysis system reads the location history to determine when a user device entered and exited a point-of-interest. Based on the amount of elapsed time between the entry and exit, the latency analysis system determines how long the user device was inside the point-of-interest. By averaging elapsed times for multiple user devices, for example, the latency analysis system determines a latency period for the specific point-of-interest. The latency analysis system then uses the latency period to provide specific recommendations to a user. For example, the latency analysis system may inform a user of checkout times for nearby grocery stores, or it may provide the user an estimated wait time at a specific restaurant.

More particularly, in some embodiments, users register with a latency analysis system. For example, a particular user may provide the user's name and other information so that the latency analysis system can create an account (or record) for the user. As part of the registration and to obtain the benefits of the methods and techniques described herein, the user may have to select a setting on the user computing device—or install an application on the user device—that allows the latency analysis system to receive location history from the user device. The user may install, for example, a latency analysis application on the user device, which permits the latency analysis system to receive location history from the user device. For example, the latency analysis system may obtain authorization from the user to receive location history from the user's computing device, such as a mobile phone of the user. In certain examples, a user may associate a financial account with the record of the user, such as a digital wallet account that the user can employ when purchasing a product.

Based on user authorizations to receive location history, the latency analysis system receives location history for multiple users. That is, multiple user devices communicate location history data to the latency analysis system, and the latency analysis system receives the location history. The location history includes, for example, information identifying past and present locations of the user device, as well as the date and time the user device was at a location. In certain examples, the location history includes fine-grained location history information. In other words, the location history may be highly accurate and hence able to identify the location of the user device to within a few feet or even a few inches. For example, the fine-grained location history may place the user device in a checkout line at a grocery store, at the entrance area of a restaurant, or in a line at an amusement park. The information received by the latency analysis system can be stripped of any user identifying information such that the latency analysis system receives only data showing that a device (without knowing which device) is at a particular location at a particular time.

After receiving the location history for multiple user devices, the latency analysis system identifies individual points-of-interest from the location history data. That is, for one or more of the user devices, when the latency analysis system receives location history from the user device, the latency analysis system identifies—from the location history for the user device—points-of-interest that correspond to the location of the user device. For example, several users carrying mobile telephones may visit a specific restaurant or grocery store. After the latency analysis system receives the location history for the users' mobile telephones, the latency analysis system identifies the specific restaurant or grocery store that the users are visiting (or have visited). The points-of-interest identified from the location history may include any geographical destinations that might be of interest to a broad range of different users, such as a restaurant, grocery store, merchant, museum, park, entertainment location, or other destinations of the user.

Based on the received location history and the identified points-of-interest, the latency analysis system determines a latency period for one or more of the specific points-of-interest. For a particular user device, the latency analysis system determines from the location history a start time (or first time), which corresponds to the time from which the latency analysis system determines how long the user carrying the device was at the point-of-interest. The latency analysis system also determines an end time (or second time) from the location history, which may correspond to the time that the latency analysis system determines that the user carrying the device has left (or is no longer waiting) at the point-of-interest, for example.

By comparing the start time to the end time for the particular user device, the latency analysis system determines a latency interval for the point-of-interest. In other words, the time that has elapsed from the start time to the end time corresponds to the latency interval at the specific point-of-interest for the particular user device. The latency analysis system then determines a latency period for a point-of-interest by aggregating multiple latency intervals that arise over a defined period of time, such as by averaging multiple latency intervals.

For example, the latency analysis system may receive a location history from a user device (e.g., a user with a particular relevant application installed or a particular setting set) placing the user device in a grocery store checkout line at a certain start time. When the user (and hence the user device) leaves the checkout line, the latency analysis system then determines the end time for the checkout process. By comparing the start time (first time) with the end time (second time), the latency analysis system determines a latency interval at the grocery store checkout line for the particular user device. The latency interval thus corresponds to the amount of time it took the particular user—and more precisely the user's device—to move through the checkout line. Then, by aggregating latency intervals for multiple user devices in checkout lines at the grocery store at a defined time, the latency analysis system determines a latency period for the checkout time at the grocer)/store. For example, the latency analysis system may determine that users arriving in the checkout line between 5:00 p.m. to 6:00 p.m. on a Sunday (that is, users arriving in a defined time window) can expect to spend to about 15 minutes in a checkout line. In other words, the latency period for 5:00 p.m. to 6:00 p.m. on a Sunday would be 15 minutes.

In situations in which the systems disclosed herein receive personal information about users, or may make use of personal information, the users may be provided with an opportunity to control whether programs or features of the system receive the user information (for example, information about a user's current location). Additionally, certain data may be treated in one or more ways before it is stored or used, so that personally identifiable information is removed. For example, a user's geographic location may be generalized where location information is obtained (such as to a city, ZIP code, or state level), so that a particular location of a particular user cannot be determined. Thus, the user may have control over how information is collected about the user and used by a system as described herein.

In another example, the latency analysis system receives location history placing multiple user devices at a specific restaurant. By determining how long the user devices remain at the restaurant, the latency analysis system can determine a latency period for the restaurant over a defined period time. For example, from the location history of a particular user device, the latency analysis system determines when the device arrived at the restaurant (a start time) and then when the device left the restaurant (an end time). By determining the elapsed time that the user device was at the restaurant—that is, the amount of time that passed from the device arriving at the restaurant to leaving the restaurant—the latency analysis system can determine a latency interval at the restaurant for the particular user device. After aggregating the latency interval with determined latency intervals of other devices at the restaurant over a defined time, such as by averaging multiple latency intervals, the latency analysis system can determine a latency period for the restaurant for a defined time. For example, the latency analysis system may determine that users spend on average 3.0 hours at the restaurant if they arrive between 6:00 p.m. and 7:00 p.m. on a Friday.

In certain examples, the latency analysis system determines a current or "real time" latency period for a specific point-of-interest, such as the current wait time at a particular restaurant. For example, using location histories with fine-grained location data, the latency analysis system may determine user devices are currently spending about 20 minutes waiting in an area of the restaurant before proceeding to a table. After averaging the latency intervals for multiple user devices at the restaurant, for example, the latency analysis system determines a latency period of 20 minutes for the restaurant, which corresponds to the current wait time at the restaurant. The latency analysis system may likewise determine that, for a specific grocery store, the current latency period for moving through a checkout line is 10 minutes.

After determining a latency period for a specific point-of-interest, the latency analysis system may then use the determined latency-period data to make latency-period comparisons among different points-of-interest or for the same point-of-interest. For example, the latency period at one grocery store may be 20 minutes at 5:00 p.m. on a Sunday, whereas the latency period for a nearby, second grocery store at the same time is 5 minutes. The latency analysis system can thus determine that the latency period for the second grocery store is 15 minutes less than the other grocery store by comparing the latency periods. In another example, the latency analysis system may likewise determine that one restaurant has a latency period that is 30 minutes longer than the latency period at a second, nearby restaurant. Hence, the latency analysis system determines that the second restaurant has a shorter wait time.

When the latency analysis system makes comparisons for the same point-of-interest, the latency analysis system can use historical, latency-period data for a specific point-of-interest to determine when certain activities at the point-of-interest occur faster or slower. The latency analysis system may determine, for example, a latency period of 3.0 hours for user devices arriving at a restaurant between 6:00 p.m. and 7:00 p.m. on a Friday, whereas the latency period for user devices arriving between 8:00 p.m. and 9:00 p.m. is 1.5 hours on the same Friday. Hence, the latency analysis system determines that the wait time for the restaurant is less for user devices arriving at 8:00 p.m. on Friday. In another example, the latency analysis system may determine, based on the latency-period data, at what times of day the checkout lines at a specific grocery store are the slowest or fastest. The latency analysis system may make a variety of different latency-period comparisons, either for a specific point-of-interest or among different (multiple) points-of-interest.

In certain examples, after accumulating latency-period data, the latency analysis system may rely on historical latency data when making a latency period determination. For example, when making a real-time, latency-period determination, the latency analysis system may determine that a large number of users are at a particular point-of-interest, such as a restaurant, compared to the usual number of users at the restaurant. Thus, the latency analysis system may determine that the latency period is longer than usual, regardless of how long users (and their user devices) take to enter the restaurant and leave the restaurant. Similarly, the latency analysis system may deter wine that significantly more users than usual are in the vicinity of a specific point-of-interest. For example, a large number of users as compared to the usual number of users may be gathered at a theater that is adjacent to a specific restaurant. Thus, the latency analysis system may determine that the latency period is longer than usual—based on the number of users in the vicinity—regardless of how long users (and their user devices) take to enter the restaurant and leave the restaurant that is adjacent to the restaurant. In other examples, the latency analysis system may determine that far fewer than usual users are at or near a location.

In certain examples, the latency analysis system may, based on the population of users at or near the point-of-interest, adjust or modify the latency period for the point-of-interest. That is, the latency analysis system may adjust or modify the latency period beyond the time determined for user devices entering and exiting a point-of-interest. For example, if the determined latency period is 2 hours at a specific restaurant, the latency analysis system may add an additional hour to the latency period to account for the additional users that are at an adjacent theater that are likely to go to the restaurant.

In another example, if more users than usual—based on historical, latency-period data—are at (or arrive at) a specific grocery store, the latency analysis system may add additional time to the determined latency period beyond that determined for user devices entering and exiting the checkout line. Alternatively, if a user population is much lower than usual at a specific point-of-interest, the latency analysis system in certain examples may decrease the determined latency period by a determined amount. The latency analysis system may thus account for various factors, such as user population, at or near a particular point-of-interest. Similarly, if significantly fewer users than usual are at a point-of-interest—but typical numbers of users are outside or around the point-of-interest—the latency analysis system may determine that the point-of-interest is closed or not open to the public. In certain examples, such as if a natural disaster affects a region, the latency analysis system may determine that several points-of-interest in the region are suddenly and/or unexpectedly closed. The latency analysis system may also determine, for example, that several user devices have suddenly and/or unexpectedly left a region, thus indicating a possible natural disaster or other event in the area. The latency analysis system can thus provide an alert to one or more users regarding the region and/or the event. Additionally or alternatively, based on such data, the latency analysis system can avoid sending a user to a closed point-of-interest or a region where users are fleeing, for example.

Based on the ability of the latency analysis system to determine latency periods for various points-of-interest, the latency analysis system receives and processes requests for users that involve latency period determinations. For example, a user planning a trip to a grocery store may search for nearby grocery stores, such as on a mapping application. Additionally or alternatively, the user may search for grocery stores that currently have the fastest checkout times. In another example, a user desiring to eat at a specific restaurant may search for the restaurant on the user device. Additionally or alternatively, the user may search for restaurants generally, such as for restaurants that are nearby. A user may also specifically request the wait time at the specific restaurant, for example. In another example, a user may ask the latency analysis system for the best time to go to a point-of-interest to avoid a wait. For example, the user may ask the latency analysis system what is the best time to go to a specific grocery store or to a particular ride at an amusement park. The latency analysis system then receives and processes the user's request.

To process the user's request, the latency analysis system reads the content of the request to determine if providing latency-period information is applicable to the request. For example, the latency analysis system may determine that the request involves one or more points-of-interest where providing latency-period information may be useful, such as a request for nearby grocery stores or restaurants. The latency analysis system then determines the latency-period information that is responsive to the request. For example, if the latency analysis system receives a request for nearby grocery stores with the fastest checkout times, the latency analysis system identifies the latency-period data for grocery stores that are near the user device. If the search involves a request specific restaurant, such as the times of day with shorter wait times, the latency analysis system identifies the latency-period data for the specific restaurant.

In certain embodiments, such as when the request involves a real-time latency period determination, the latency analysis system may perform an additional latency-period determination in response to receiving and reading the user request. For example, if the latency analysis system receives a request for a current wait time at a specific restaurant, the latency analysis system may perform an additional latency-period determination in response to receiving and reading such a request. In other embodiments, such as when the latency analysis system does not have any historical location data for a specific point-of-interest, the latency analysis system may determine the latency period for the point-of-interest as described herein in response to receiving and reading the user's request. For example, the latency analysis system may determine that users entering a restaurant are quickly being seated. Hence, the latency analysis system may determine a current latency period of 1 minute for the restaurant.

After the latency analysis system deter nines information that is responsive to a user request, the latency analysis system communicates a response to the user that incorporates a latency period determination. For example, if a user requests the wait time at a specific restaurant, the latency analysis system will provide the expected wait time for the restaurant to the user in a response to the user's request. If a user makes a request that involves comparing different points-of-interest, for example, the latency analysis system will provide the comparative information to the user. For example, if a user seeks to identify nearby restaurants and the associated wait time for each restaurant, the latency analysis system will—in response to the request—identify the wait time at restaurants near the user device. Likewise, if a user requests grocery stores nearby, the latency analysis system can provide checkout times for various nearby grocery stores. The user then receives the communication on the user device of the user.

In certain examples, the latency analysis system may communicate a response to the user that links latency-period determinations with other useful information. For example, the latency analysis system may couple the latency-period determinations with travel time to various points-of-interest. If the latency analysis system receives a user request for nearby grocery stores, for example, the latency analysis system may provide the checkout time combined with the travel time to the points-of-interest to provide an overall user experience time. For example, the latency analysis system may identify five nearby grocery stores based on the current location of the user device, along with the checkout times at each grocery store. And, based on the latency-period information for each grocery store, the latency analysis system may also make specific recommendations, such as a ranking order of which grocery stores are faster on the whole. In other words, the latency analysis system may inform the user that a grocery store that is further away is overall the fastest option because of shorter checkout times at the grocery store. The latency analysis system can determine and provide a variety of responses that incorporate (or are based on) the latency-period data.

When communicating responses that incorporate latency-period data, the latency analysis system can provide qualitative or quantitative latency-period information to the user. For example, using the latency-period data, the latency analysis system may communicate that one point-of-interest has a longer wait time than one or more other points-of-interest. The latency analysis system may likewise inform a user that certain times of the day are better than others for arriving at the point-of-interest. Yet in other examples, the latency analysis system may inform the user that a particular point-of-interest has a longer (quantitatively) wait time than one or more other points-of-interest. For example, the latency analysis system may inform the user that a particular restaurant has a 20-minute wait, whereas two other nearby restaurants have a 10-minute wait time and a 5-minute wait time, respectively.

In another example, the latency analysis system combines latency-period information with estimated drive time information to provide a quantitative total time for the point-of-interest. For example, if based on the latency-period data for a grocery store the latency analysis system determines that the checkout time at a grocery store is 7 minutes—and the drive time to the grocery store is 13 minutes—the latency analysis system may communicate a total time of 20 minutes to the user for the grocery store. In other example embodiments, the latency analysis system may present results incorporating the latency period information in a subtle manner. For example, the latency analysis system may rank or order multiple points-of-interest based on the expected total experience time and present the ordered points-of-interest to the user. In certain embodiments, the user may select a feature that requests search results are ordered based on wait time or total user experience time. The presented results may provide a list of the ordered points-of-interest and may or may not also show the corresponding times.

Also as disclosed herein, the latency analysis system may rely on latency period data to determine and generate a shopping route (or alternate route) for a user that is shopping for specific products. For example, a user may provide a shopping list of products to the latency analysis system. Based on the location of the user and the latency periods at one or more merchant locations offering the products on the shopping list for sale, the latency analysis system determines a shopping route, such as a faster shopping route or alternate route, for the user to obtain the products. The latency analysis system then communicates the shopping route to the user via the user device of the user.

More particularly, a user may enter a shopping list of products that the user intends to purchase, such as on a user interface of the user device of the user. In certain examples, the user may also identify merchant locations where the user expects to purchase the products. The user may also provide an expected departure time, such as the time the user expects to leave the user's current location to begin the shopping trip. The user may also provide other user preferences, such as a preferred mode of travel, including, for example, walking bicycle, car, train, or combinations thereof. The latency analysis system then receives the user's shopping list, along with the optionally identified merchant locations for obtaining the products on the list, any departure time, mode of transportation, and other user preferences.

After receiving the user's shopping list, for example, the latency analysis system identifies the current location of the user device (and hence the user). Based on the location of the user device, the latency analysis system determines merchant locations near the user device, such as merchant locations within a defined radius around the user device, offering one or more of the products for sale. In certain examples, in addition to identifying individual points-of-interest from the location history data as described above, the latency analysis system may identify specific merchant locations (as points-of-interest) that generally offer products for sale. The latency analysis system may then associate the products in a record for the merchant, such that the product information is accessible for the merchant location. Additionally or alternatively, the latency analysis system may determine, in response to receiving a user shopping list, nearby merchants that offer one or more of the products by sale by accessing a website of the merchant. The latency analysis system may also determine other information, such as the price of the one or more products at different merchant locations and/or offers associated with the one or more products. In certain example embodiments, such as when the user provides a departure location that is different from the current location of the user, the latency analysis system determines merchant locations that are near the departure location.

Once the latency analysis system determines one or more merchant locations near the user device (or the departure location) offering one or more of the products for sale, the latency analysis system determines a latency period for the merchant locations as described herein. For example, based on the location data for the determined merchant locations, the latency analysis system may determine the current or expected wait time of the merchant locations, such as the time of day that one or more of the merchant locations are busy or less busy as described herein. The latency analysis system may also determine, for example, whether a particular merchant location offering one or more of the products for sale is open or closed. The latency analysis may also determine the expected travel time to and from the merchant.

Based on determined latency period for the one or more of the merchant locations offering the one or more of the products for sale, the latency analysis system then determines a shopping route or alternate shopping routes for obtaining one or more of the products. In certain embodiments, the latency analysis system determines the most efficient route, for example, for the user to obtain the one or more products on the user's shopping list. For example, if a user identifies ten products on a shopping list, the latency analysis system determines—based on the latency periods for merchant locations near the user—the order in which the user should visit the determined merchant locations to obtain the ten products. In other words, based on the latency period data for each determined merchant location, the latency analysis system determines the order the user should visit each merchant location so that the amount of time the user spends in each location gathering products is minimized.

For example, the latency analysis system may determine that three of the products on the shopping list of the user can be obtained at merchant A, while two of the products can be obtained at merchant B, and the remaining products can be obtained at merchant C. Based on the determined latency period data for each of merchants A, B, and, C, the latency analysis system may then determine that—if a user leaves the current user device location at 1:00 p.m. to begin shopping—the user will most efficiently (most quickly) obtain the ten products by first visiting merchant B, then merchant C, and then lastly merchant A. For example, the latency analysis system may determine that departing for a shopping trip at 1:00 p.m. and traveling to merchant B, C, and then A (in this order) may save the user 30 minutes when compared to departing at 1:00 p.m. and traveling to merchant A, then to merchant B, and then to merchant C.

In certain examples, the latency analysis system may rely on the latency period data to also determine the best departure time for the user. For example, the latency analysis system may determine that departing at 2:00 p.m., instead of 1:00 p.m. on the same day—and traveling to merchant B, C, and then A—results in a more optimal overall route for the user to obtain the ten products. In certain examples, the latency analysis system may determine multiple departure times and routes associated with each departure time. In certain examples, the latency analysis system may determine a specific day is preferred. For example, the latency analysis system may determine that completing the shopping trip on a Monday is faster than completing the same shopping trip on a Sunday.

In certain examples, such as when the latency analysis system receives merchant locations from the user, the latency analysis system may include the user-identified locations in the optimal route determination. That is, the latency analysis system may determine that including one or more of the user-identified locations results in the fastest route (or an faster alternate route) for the user to obtain the products on a shopping list. In certain examples, the latency analysis system may determine a shopping route that includes only the merchant locations that the user identifies. In certain examples, the latency analysis system may suggest merchant locations that are different than those the user identifies.

In certain examples, when determining the latency periods for merchant locations offering the one or more products on the user's shopping list for sale, the latency analysis system may couple the latency-period determinations with travel time to the merchant locations as described herein. For example, travel time alone may indicate a particular route where the user travels from merchant A to merchant B and then to merchant C to obtain the shopping list products, whereas latency period data alone may indicate that the user should travel to Merchant B, then merchant C, and then merchant A to obtain the products. Coupling latency period data with travel-time data, however, may result in a generated route, such as a faster route, where the user travels first to merchant A, then merchant C, then merchant B. The travel time may include, for example, walking time, bicycling time, or driving time.

After determining a route for the user to obtain the products on the shopping list, the latency analysis system communicates the route to the user device of the user. Hence, the latency analysis system provides the user with a preferred route, for example, to obtain one or more of the products on the users shopping list. In certain examples, the latency analysis system may provide the user with a suggested departure time or a list of departure times that are each associated with a particular route. In certain examples, the latency analysis system may include travel time associated with a route provided to the user, thus informing the user of the total time to obtain products on the shopping list of the user.

In certain example embodiments, the latency analysis system may provide a user interface on the user computing device of the user so that the user can "check off" products on the shopping list that the user purchases. In certain other examples, the latency analysis system may automatically "check off" products that the user purchases after the user purchases the products. For example, after a user leaves a merchant location on the shopping route, the latency analysis system may assume that the user has obtained the products associated with the merchant location. In other examples, the latency analysis system may confirm that the user purchased the products, such as by reading purchase transaction information associated with a digital wallet of the user.

By using and relying on the methods and systems described herein, a user that receives communications incorporating latency-period information, such as wait times at a specific points-of-interest, can make informed choices about the points-of-interest. For example, the user can decide—based on wait times among nearby grocery stores—which specific grocery store the user wants to do his or her grocery shopping. The methods and systems described herein not only benefit the user, but also merchants. For example, grocery stores can use the latency-period information to monitor which times of day (and/or day of the week or month, for example) the store's checkout lines are the slowest. The grocery store can then adjust staffing, for example, based on user flow through the checkout lines. The grocery store can also use the latency-period data and information, for example, to re-direct users to other locations of the grocery store chain that are less busy. Further, by providing methods and systems to generate one or more shopping routes, the methods and systems disclosed herein allow a user to more quickly and efficiently obtain products on a shopping list of the user.

Example System Architectures

Turning now to the drawings, in which like numerals indicate like (but not necessarily identical) elements throughout the figures, example embodiments are described in detail.

FIG. 1 is a block diagram depicting a system for determining a latency period for a points-of-interest, in accordance with certain example embodiments.

As depicted in FIG. 1, the exemplary operating environment 100 includes a user network computing device 110, a merchant computing system 130, and a latency analysis computing system 140 that communicate with each other via one or more networks 105. In another example embodiment, two or more of these systems (including systems 110, 130, and 140) or parts thereof are integrated into the same system. In certain example embodiments, a user 101 associated with a user device 110 must install an application and/or make a feature selection on the user device 110 to obtain the benefits of the methods and techniques described herein.

Each network 105 includes a wired or wireless telecommunication means by which network devices (including devices 110, 130, and 140) can exchange data. For example, each network 105 can include a local area network ("LAN"), a wide area network ("WAN"), an intranet, an Internet, a storage area network (SAN), a personal area network (PAN), a metropolitan area network (MAN), a wireless local area network (WLAN), a virtual private network (VPN), a cellular or other mobile communication network, Bluetooth, near field communication (NFC), or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device 110, 130, and 140 includes a device having a communication module capable of transmitting and receiving data over the network 105. For example, each network device 110, 130, and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 130, and 140 are operated by end-users or consumers, merchant system operators, and latency analysis system operators.

The user 101 can employ a communication application 113, such as a web browser application 114 or a stand-alone application, to view, download, upload, or otherwise access documents or web pages via a distributed network 105. The communication application 113 of the user computing device 110 can interact with web servers or other computing devices connected to the network 105. For example, the communication application 113 can interact with the user network computing device 110, the merchant system 130, and/or the latency analysis system 140. The communication application 113 may also comprise a web browser (not shown), which provides a user interface, for example, for accessing other devices associated with the network 105.

The user computing device 110 includes a latency analysis application 112. The latency analysis application 112, for example, communicates and interacts with the latency analysis system 140, such as via that the communication application 113. In order to obtain the benefits of the latency analysis system 140 as described herein, for example, a user 101 may have to download and install the latency analysis application 112 on the user device 110. The latency analysis application 112, for example, may be configured, based on user preferences, to obtain, receive, and communicate location history of the user 101, including find-grained location data, to latency analysis system 140. The latency analysis application 112 may also be configured to receive a shopping list of a user 101 and to provide a shopping route to the user 101 for obtaining one or more of the products on the shopping list.

In certain example embodiments, the user computing device 110 may include a digital wallet application (not shown). The digital wallet application may encompass any application, hardware, software, or process the user computing device 110 may employ to assist the user 101 in completing a purchase transaction. The digital wallet application can interact with the communication application 113 or can be embodied as a companion application of the communication application 113. As a companion application, the digital wallet application can execute within the communication application 113. That is, the digital wallet application may be an application program embedded in the communication application 113.

For example, the latency analysis application 112 may be configured to communicate and interact with a location service provider that, in conjunction with the user device 110, facilitates determination of the location of the user device 110. For example, the latency analysis application 112 may, along with a location service and/or hardware of the user device 110, rely on WiFi signals and cellular communication towers to determine the location of the user device 110. Additionally or alternatively, the latency analysis application 112 may rely on satellites, Global Positioning System ("GPS") location technology, a Network Location Provider ("NLP"), a map application, or other location identifying technology of the user device 110 to determine location history for the user device 110. Additionally or alternatively, the latency analysis system may rely on enhanced GPS systems and methods, such as those associated with a Differential Global Positioning System ("DGPS"). Additionally or alternatively, the latency analysis system may rely on indoor localization techniques. In certain example embodiments, the latency analysis application 112 can interact with other application on the user device 110, such as a mapping application (not shown) on the user device 110 and/or a digital wallet application (not shown).

Alternatively, the latency analysis application 112 can be embodied as a companion application of a mapping application on the user device 110. As a companion application, the latency analysis application 112 can execute within the mapping application. That is, the latency analysis application 112 may be an application program embedded in the mapping application. In certain example embodiments, the latency analysis application 112 executes and operates independently of the mapping application. In certain example embodiments, the latency analysis application 112 includes mapping components that allow the latency analysis application 112 to present and display mapping information to the user 101.

The user computing device 110 may also include a data storage unit 117. The example data storage unit 117 can include one or more tangible computer-readable storage devices. The data storage unit 117 can be a component of the user device 110 or be logically coupled to the user device 110. For example, the data storage unit 117 can include on-board flash memory and/or one or more removable memory cards or removable flash memory. In certain example embodiments, the data storage unit 117 may, at the option of the user, store location data pertaining to the user 101. In certain example embodiments, the data storage unit 117 may include cache memory that can, for example, receive and store location data for the user device 110.

The merchant computing system 130 represents a system that offers products and/or services for the user 101 to purchase or use. In certain example embodiments, the merchant system 130 includes a point-of-sale ("POS") terminal 134. The point-of-sale terminal 134 may be operated by a salesperson that enters purchase data into the point-of-sale terminal to complete a purchase transaction. The merchant system 130 may be a physical location, such as any point-of-interest that may be of interest to a user 101. Affiliated or associated with the merchant system 130 is a merchant system operator (not shown). The merchant computing system 130 may comprise a merchant server 135, which in certain example embodiments may represent the computer-implemented system that the merchant system 120 employs to create and assemble a website 136 and content for the website 136. In certain example embodiments, a point-of-interest as described herein may or may not require all the components of the merchant system 130, such as a merchant server 135 or website 136 of the merchant system. For example, the merchant system 130 may represent a point-of-interest having a physical location with a point-of-sale terminal 134. In certain example embodiments, the system 130 may include multiple merchant locations, such as multiple locations of a merchant chain.

The latency analysis system 140 represents a system for analyzing and determining latency periods at one or more points-of-interest. The latency analysis system 140 also represents a system that, based on latency period determinations, determines one or more shopping routes for a user 101. The latency analysis system 140 is configured to interact with and receive data and information from the user computing device 110 via the network 105. For example, at the option of the user 101, latency analysis system 140 receives user location history from the user computing device 110, such as from the latency analysis application 112 and/or a mapping application (not shown) on the user device 110. The latency analysis system 140 is also configured to communicate with the merchant system 130, such as via the network 105.

The latency analysis system 140 can include a web server 141, which may represent the computer-implemented system that the latency analysis system 140 employs to determine latency intervals for user devices 110 and latency periods for points-of-interest. For example, the latency analysis system 140 and associated web server 141 may be configured to receive and/or obtain user device location history, determine latency intervals for user devices, determine latency periods for points-of-interest, and process user requests involving latency period determinations. The latency analysis system 140 may also include a website 142 and a user account 143. A user 101, for example, may utilize a user interface of the website 142 to register with the latency analysis system 140 and hence create a record with the latency analysis system 140, such as the user account 143. In certain example embodiments, the user account 143 is associated with a financial account of the user 101, such as a digital wallet account (not shown) of the user 101.

The latency analysis system 140 may also include an accessible data storage unit 144. In certain example embodiments, for example, the data storage unit 144 stores received location history of the multiple users 101. For example, the data storage unit 144 may receive and store location history generated when users 101, with their user computing devices 110, visit various points-of-interest. The exemplary data storage unit 144 can include one or more tangible computer-readable media. The data storage unit 144 can be stored on the user device 110 or can be logically coupled to the user device 110. For example, the data storage unit 144 can include on-board flash memory and/or one or more removable memory cards or removable flash memory.

In certain example embodiments, the latency analysis functions of the latency analysis system 140 operate and execute fully and completely on the user device 110, such as within, or as a companion application to, the latency analysis application 112. Alternatively, the latency analysis functions of the latency analysis system 140 may operate and execute separately and independently from the user device 110. For example, latency analysis system 140 may operate and execute within a separate computing system or other computing system that determines latency periods as described herein. Alternatively, in other example embodiments the latency analysis functions of the latency analysis system 140 may execute partially on the user device 110 and/or partially on a separate computing system. For example, the latency analysis functions of the latency analysis system 140 may occur both via the latency analysis system 140 and the latency analysis application 112.

It will be appreciated that the network connections shown are example and other means of establishing a communications link between the computers and devices can be used. Moreover, those having ordinary skill in the art and having the benefit of the present disclosure will appreciate that the user device 110, merchant system 130, and latency analysis system 140 in FIG. 1 can have any of several other suitable computer system configurations. For example, a user computing device 110 embodied as a mobile phone or handheld computer may not include all the components described above.

Example Processes

The components of the example operating environment 100 are described hereinafter with reference to the example methods illustrated in FIGS. 2-5.

Figure 2:
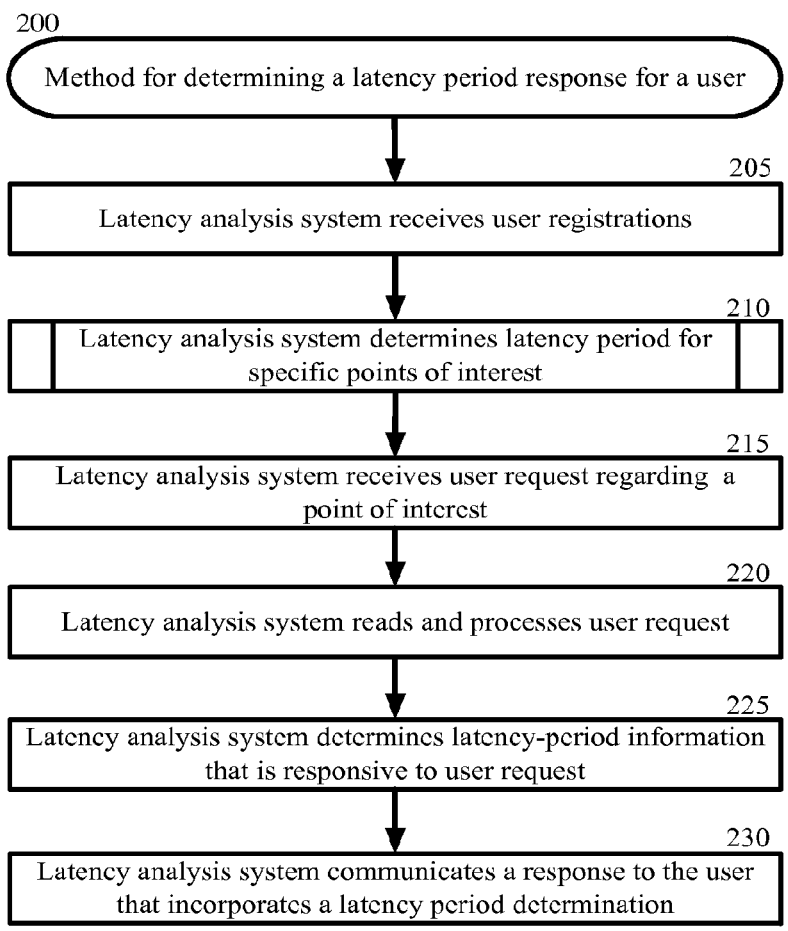
FIG. 2 is a block flow diagram depicting a method for determining a latency period response for a user, in accordance with certain example embodiments.

FIG. 2 is a block flow diagram depicting a method 200 for determining a latency period response for a user, in accordance with certain example embodiments.

With reference to FIGS. 1 and 2, in block 205, the latency analysis system receives user 101 registrations from multiple users 101. That is, users 101 desiring to provide the location information of their user devices 110 to the latency analysis system 140 may register with the latency analysis system 140. As part of the registration process, a particular user 101 may provide the user's name and other information so that the latency analysis system 140 can create a user account 143 (or record) for the user 101. In certain example embodiments, to obtain the benefits of the methods and techniques described herein, the user 101 may have to select a setting on the user device 110. Additionally or alternatively, the user 101 may have to install an application on the user device 110, such as a latency analysis application 112, which allows the latency analysis system 140 to receive location history from the user device 110 of the registered user 101. As another example, the latency analysis system 140 may also obtain authorization from the user 101 to receive location history from the user device 110 of the registered user 101, such as a mobile phone of the user 101.

In block 210, the latency analysis system 140 determines the latency period for specific points-of-interest. That is, for one or more points-of-interest, the latency analysis system 140 uses location history received from multiple users, for example, to determine the latency period (delay or wait-time) at the one or more points-of-interest. Upon receipt of the location history, for example, the location history can be stripped of any user identifying information. The latency analysis system thus receives only data showing that a device (without knowing which device) is at a particular location at a particular time. For example, a user 101 may select a setting on the user device 110, such as a setting of the latency analysis application 112, which strips the location information of user-identifying information before the latency analysis system 140 receives the location history. In certain examples, after using the received location history to determine a latency for various points-of-interest, the latency analysis system 140 compares the latency period for each of the one or more points-of-interest or among different points-of-interest. The details of block 210 are described in further detail below with reference to FIG. 3.

Figure 3:
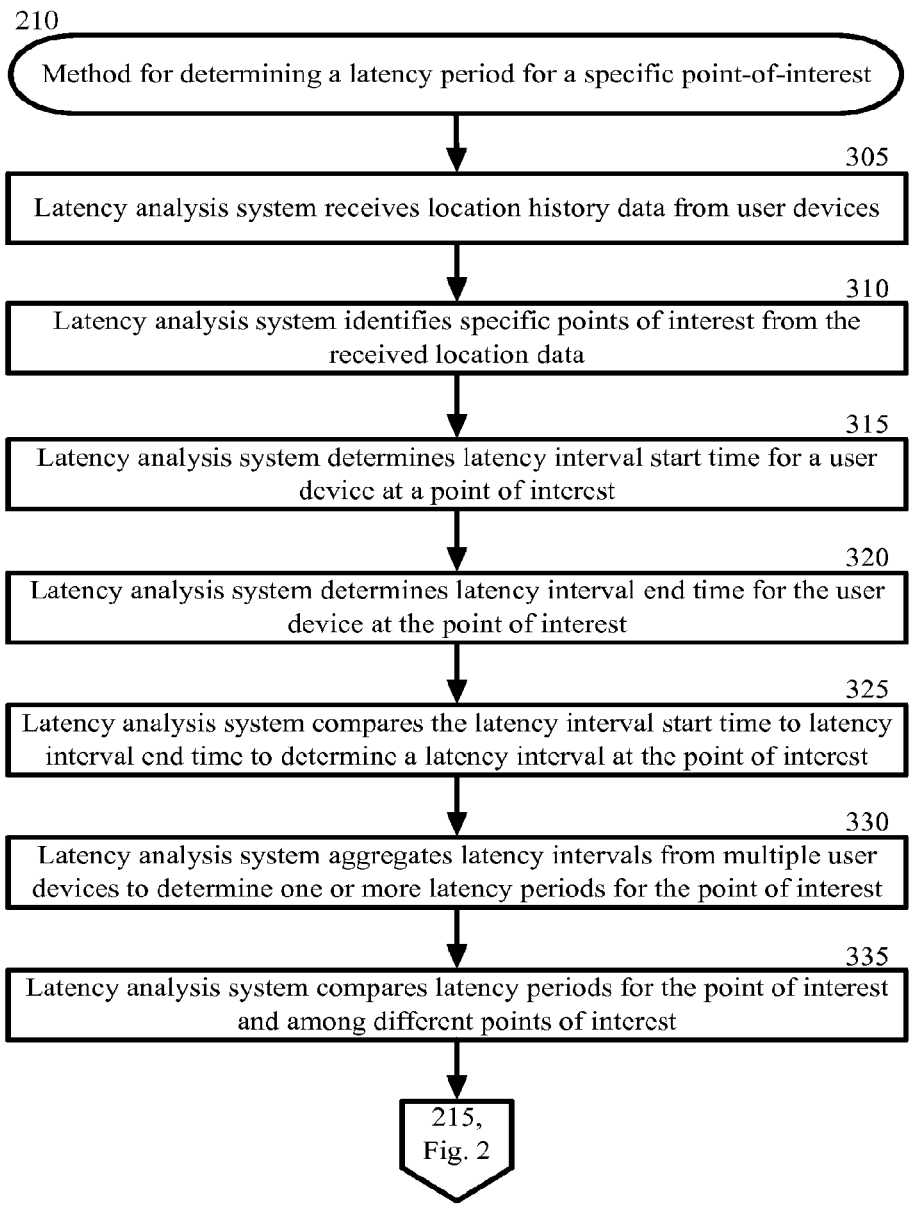
FIG. 3 is a block flow diagram depicting a method for determining a latency period for a specific point-of-interest, in accordance with certain example embodiments.

FIG. 3 is a block flow diagram depicting a method 210 for determining the latency period for a specific point-of-interest, in accordance with certain example embodiments, as referenced in block 210 of FIG. 2.

With reference to FIGS. 1 and 2, in block 305 of method 210, the latency analysis system 140 receives location history data from user devices 110. That is, based on the authorizations of multiple users 101 to receive location history data, multiple user devices 110 communicate location histories to the latency analysis system 140 and the latency analysis system 140 receives the location history. Each location history includes, for example, information identifying past and present locations of the user device 110, as well as the date and time the user device 110 was at a location. For example, as a user device 110 travels to different locations, the location of the user device 110 may be stored in the data storage unit 117 of the user device 110, such as in the cache memory of the user device 110, thus generating a location history for the user device 110. The latency analysis application 112 on the user device 110, for example, can then communicate the location history to the latency analysis system 140, such as via the communication application 113 of the user device 110 and via the network 105.

In certain example embodiments, a location application (not shown) on the user device 110, for example, determines the location of the user device 110, such as the latitude and longitude coordinates of the user device 110. For example, the location application may associate with a location-based service to determine the location of the user device 110. The location provider and/or the user device 110, for example, may rely on WiFi signals, cellular communication data, satellites, a Global Positioning System ("GPS") location technology, a Differential Global Positioning System ("DGPS"), a Network Location Provider ("NLP"), a map application, an indoor localization application, or other location identifying technology of the user device 110 to determine the user device location. Additionally or alternatively, the location history for the user device 110 may comprise any other suitable location data, such as the street address for the user device 110 or Ordnance Survey Grid Reference information for the user device 110. The location application, for example, communicates the location history to the latency analysis system 140, and the latency analysis system 140 receives the location history. In certain example embodiments, the latency analysis system 140 converts location data to latitude and longitude coordinates for the user device 110.

In certain examples, the location history that the latency analysis system 140 receives includes fine-grained location history information, such as location data from a Differential Global Positioning System ("DGPS"). In other words, the location history may be highly accurate and hence be able to identify the location of the user device 110 to within a few feet or even a few inches. For example, the fine-grained location history may place the user device 110 at a specific geographical location within a point-of-interest, such as at a checkout line at a grocery store or at the entrance area of a restaurant. After receiving the location history from the user devices, the latency analysis system 140 can, in certain examples, store the location history information, such as in the data storage unit 144 of the latency analysis system 140. The latency analysis system 140 can then later access the stored location history data from the data storage unit 144.

In block 310, the latency analysis system 140 identifies specific points-of-interest from the received location history. That is, for one or more of the user devices 110, when the latency analysis system 140 receives location history from the user device 110, the latency analysis system identifies— from the location history for the user device—points-of-interest that correspond to the location of the user device 110. The points-of-interest can comprise specific merchant storefronts or merchant locations, retailers, restaurants, landmarks, buildings, parks, rail stations, airports, ports, sports arenas, or any other geographical location that might be of interest to one or more users 101. For example, several users 101 carrying mobile telephones may visit a specific merchant system 130 having a point-of-sale terminal 134, such as a restaurant or grocery store. After the latency analysis system 140 receives the location history for the users' mobile telephones, the latency analysis system identifies the specific restaurant or grocery store that the users 101 are visiting (or that the users have visited). In certain example embodiments, the points-of-interest may include particular merchant locations, such as particular merchant locations offering specific products for sale.

In certain example embodiments, in addition to identifying specific points-of-interest, the latency analysis system 140 determines—for particular merchant locations—specific products that the merchant offers for sale. For example, the latency analysis system 140 may request, via the network 105, a product listing for a particular merchant location, such as a merchant point-of-sale terminal 134, of a merchant system 130. The latency analysis system 140 then receives the product listing from the merchant system 130. Additionally or alternatively, the latency analysis system 140 determines products that a particular merchant location offers for sale by accessing the merchant website 136 of the merchant location. That is, by reading the website 136 of the merchant location, the latency analysis system 140 determines the products that the merchant location, such as a merchant point-of-sale terminal 134, offers for sale. The latency analysis system 140 can then associate the products a particular merchant offers for sale with a record for the particular merchant.

Additionally or alternatively, the latency analysis system 140 determines products that a particular merchant offers for sale based on received purchase transaction information from the merchant location. That is, in certain example embodiments, the user account 143 of the latency analysis system 140 may be associated with a financial transaction account of the user 101, such as a digital wallet account of the user 101. As a user 101 purchases products with the financial account, the latency analysis system 140 receives information identifying the purchased products. As the latency analysis system 140 receives product information for multiple users 101, the latency analysis system 140 may determine a product list for the merchant location (which can be stripped of any user identifying information). The latency analysis system 140 can then associate the determined product list for particular merchant offers for sale with a record for the particular merchant. As used herein, a "product" comprises any tangible or intangible product, including services. For example, the product may include merchandise offered for sale at a merchant point-of-sale terminal 130 of a merchant location of a merchant system 130.

In block 315, in order to determine a latency period for a specific point-of-interest, the latency analysis system 140 determines a latency interval start time for a user device 110 at the specific point-of-interest. That is, for a particular user device 110 that is currently at (or has been to) the specific point-of-interest, such the point-of-sale terminal 134 of a merchant system 130, the latency analysis system 140 determines from the location history a start time (or first time) for the user device 110. The start time (or first time) corresponds to the time from which the latency analysis system 140 determines how long the user carrying the device was at the point-of-interest. For example, the latency analysis system 140 may determine that the start time for a user device 110 at a merchant system 130, such as a grocery store, occurs when the user device 110 arrives at the checkout line of the grocery store. In other words, fine-grained location data, for example, in the location history of the user device 110 may place the user device 110 at the entrance to a checkout in a particular grocery store at a specific time. The latency analysis system 140 may then determine that the time the user device entered the checkout line is the start time for the user device 110 at the grocery store. In certain example embodiments, the latency analysis system 140 may determine that user 101 leaves a checkout line when the user 101 pays for a product, such as when the user 101 pays with a digital wallet account. For example, the user 101 may provide financial account information to a point-of-sale terminal 134, such as through near field communication ("NFC"). The latency analysis system 140 then determines the checkout time, for example, based on the time of the payment upon receipt of transaction information from the digital wallet application of the user 101.

In certain example embodiments, the start time may correspond to the time when the latency analysis system 140 first determines that a user device 110 is waiting in a line. For example, the latency analysis system 140 may determine that the start time occurs when a user device 110 is no longer moving around within a merchant location, but rather remaining relatively stationary, such as in a checkout line at a grocery store. In certain example embodiments, other user devices 110 may also be relatively stationary in the same location within a merchant, in which case the location of the relatively stationary user devices 101 may correspond to the location of a checkout line of the merchant. By being relatively stationary, the only motion associated with the user device would correspond to a shuffling motion (for example, moving a short distance in a slow time frame), for example, that is commonly associated with a user 101 carrying a user device 110 as the user 101 progresses through a line.

Similarly, the latency analysis system 140 may determine that the start time (or first time) for a user device 110 that has been to a restaurant was when the user device arrived at the restaurant. Alternatively, the latency analysis system 140 may determine, such as by relying on fined-grained location data, that the start time for the user device 110 at the restaurant at occurs when the user device arrives in the waiting area of the restaurant, and, for example, begins to wait. In another example, latency analysis system 140 may determine that a start time for an amusement park occurs when the user device 110 arrives in a line to get in to the amusement park. In another example embodiment, the latency analysis system 140 may determine that the start time occurs—for a particular ride at the amusement park—when the user device 110 arrives in the line for the ride and/or begins to wait in line, for example. As one skilled in the art will appreciate, the latency analysis system 140 can determine a variety of start times that correspond to when the latency analysis system 140 begins the determination of a latency interval for a particular user device 110 at a specific point-of-interest.

In block 320, the latency analysis system 140 determines a latency interval end time (or second time) for the user device 110 at the specific point-of-interest. The latency interval end time, for example, corresponds to the time point that the latency analysis system 140 determines, for example, that the latency event being analyzed ceases. For example, the end time may correspond to the time that the latency analysis system determines that the user 101 carrying the user device 110 has left (or is no longer waiting) at the point-of-interest. In other words, if the latency analysis system 140 is determining how long it takes users 101 to pass through a checkout line at a point-of-sale terminal at a merchant system 130, the end time for a particular user device 110 may correspond to when the user device 110 first leaves the checkout line.

Alternatively, the latency analysis system 140 may determine the end time corresponds to when the user device 110 leaves the merchant system 130. In certain other example embodiments, such as when the latency analysis system 140 is determining the wait time at a specific restaurant, the latency analysis system 140 may determine that the end time occurs when the user device 110 leaves the waiting area of the restaurant and enters the seating area. As one skilled in the art will appreciate, the latency analysis system 140 can determine a variety of end times that correspond to when the latency analysis system 140 ceases the determination of a latency interval for a particular user device 110 at a specific point-of-interest.

In block 325, the latency analysis system 140 compares the latency interval start time to latency interval end time to determine a latency interval at the point-of-interest. That is, after determining a latency interval start time (first time) and an end time (second time) for a particular user device at a specific point-of-interest, the latency analysis system 140 determines the elapsed time between the start time and the end time. The time that has elapsed from the start time to the end time thus corresponds to the latency interval at the specific point-of-interest for the particular user device 110.

For example, that latency analysis system 140 may determine, based on the received location history, that a user device 110 arrives at a specific grocery store checkout line at 5:50 p.m. on a specific date and then leaves the grocery store checkout line at 6:00 on the same date. In such an example, the latency analysis system 140 may determine a start time of 5:50 p.m. and an end time of 6:00 p.m. Based on the determined start time and end time, the latency analysis system 140 may determine latency period interval—for the particular user device 110 at the specific point-of-interest—of 10 minutes. In other words, the determined latency interval of 10 minutes is a function of the time that elapsed between start time of 5:50 p.m. and an end time of 6:00 p.m. The latency interval thus corresponds to the amount of time it took the particular user 101—and more precisely the user's device 110—to move through the checkout line.

In block 330, the latency analysis system 140 aggregates latency intervals from multiple user devices 110 to determine one or more latency periods for the specific point-of-interest at a defined time. That is, after the latency analysis system 140 determines a latency interval for two or more particular user devices 110 at a specific point-of-interest, the latency analysis system 140 determines the latency period—at a defined time—as a function of the latency interval for the two user devices 110. For example, the latency analysis system 140 may determine that the latency period for a specific retailer at 5:00 on a specific date is 10 minutes. In another example, the latency analysis system may determine that users arriving in a checkout line between 5:00 p.m. to 6:00 p.m. on a Sunday (a defined time) can expect to spend to about 15 minutes in a checkout line. In other words, the latency period for 5:00 p.m. to 6:00 p.m. on a Sunday would be 15 minutes.

To aggregate the latency intervals, the latency analysis system 140 may average multiple latency intervals to determine the mean latency interval duration for the multiple user devices 110. The mean latency interval duration would then, for example, correspond to the latency period. Alternatively, the latency analysis system 140 may rely on other means of aggregating the latency intervals to determine the latency period, such as by determining the median, mode, or range associated with multiple latency intervals. By aggregating the latency intervals, the latency analysis system 140 determines one or more latency periods for a defined time.

For example, if four user devices 110 arrive at a specific retailer between 5:00 p.m. to 6:00 p.m. on a Sunday (a defined time), the latency analysis system 140 may determine four latency intervals. Each of the five user devices 110 may arrive at point-of-interest at 5:00, 5:15, 5:20, and 6:00 p.m. (start times), and respectively leave at 5:10, 5:30, 5:30, and 6:05 p.m. (end times). The latency analysis system 140 thus may respectively determine latency intervals of 10 minutes, 15 minutes, 10 minutes, and 5 minutes for each of the four user devices 110. By averaging the determined latency intervals, the latency analysis system 140 determines a latency period of 10 minutes for user devices 110 arriving at the point-of-interest between 5:00 p.m. to 6:00 p.m. on the Sunday.

In certain example embodiments, the latency analysis system 140 may determine several latency periods for the same point-of-interest. For example, the latency analysis system 140 may determine a latency interval for user devices 110 arriving at the point-of-interest at different times of the day, week, month or year. In certain example embodiments, such as when the latency analysis system 140 is only able to determine a single latency interval for a specific point-of-interest, the latency analysis system 140 may rely on the single latency interval to determine the latency period. That is, the latency analysis system 140 may determine that the latency interval for a particular user device 110 equals or approximates the latency period for the point-of-interest.

In certain example embodiments, the latency analysis system 140 determines a current or real-time latency period for a specific point-of-interest. That is, the latency analysis system 140 determines the current wait time at the point-of-interest, such as the wait time at a restaurant. For example, using location histories with fine-grained location data, the latency analysis system 140 may determine that multiple user devices 110 gather in an area of the restaurant before proceeding to a table. The latency analysis system 140 may determine—based on the time that elapses from when the user devices 110 arrive at the restaurant waiting area (start time) to the time the user devices 110 leave the restaurant (end time)—multiple latency intervals. After averaging the latency intervals for the multiple user devices 110 at the restaurant, the latency analysis system may determine determines a latency period of 20 minutes, for example, for the restaurant. The latency period thus corresponds to the current wait time at the restaurant. The latency analysis system may likewise determine that, for a specific grocery store, the current latency period for moving through a checkout line is 10 minutes.

As one skilled in the art will appreciate, the latency analysis system 140 may determine latency periods for a variety of different points-of-interest. The latency analysis system 140 may also store latency period information for several points-of-interest. For example, the latency analysis system 140 may store the latency period information in the data storage unit 144 of the latency analysis system 140. The latency analysis system 140 may also store latency interval determinations for a variety of points-of-interest in the in the data storage unit 144 of the latency analysis system 140. The latency analysis system 140 can then access the stored latency period and/or latency interval data to may additional determinations, such as comparisons among different points-of-interest.

In block 335, the latency analysis system 140, in certain example embodiments, compares latency periods for the point-of-interest and among different points-of-interest. That is, for the same point-of-interest, the latency analysis system 140 may compare the latency period from different defined times, so as to make comparisons between the different times for the same point-of-interest. For example, the latency analysis system 140 may compare the latency periods for devices arriving at the point-of-interest around 5:00 p.m. on a given day and devices arriving at the point-of-interest around 6:00 p.m. on the same day. The latency analysis system 140 may also compare the latency period at one point-of-interest to the latency periods at one or more other points-of-interest. For example, for two points-of-interest, the latency analysis system 140 may determine the latency period, such as a real-time latency period, for devices arriving at 5:00 p.m. Based on the comparison between the two points-of-interest, the latency analysis system 140 can determine which point-of-interest currently the longest wait time, for example.

When the latency analysis system 140 makes comparisons for the same point-of-interest, the latency analysis system 140 may rely on historical, latency-period data for a specific point-of-interest to determine when certain activities at the point-of-interest occur faster or slower. For example, the latency analysis system 140 may access latency period data stored in the data storage unit 144 of the latency analysis system 140. By relying on the historical latency-period information, the latency analysis system 140 may determine a latency period of 3.0 hours for users arriving at a merchant system 130, such as a restaurant, between 6:00 p.m. and 7:00 p.m. on a Friday. In contrast, the latency analysis system 140 may determine that the latency period for users arriving at the restaurant between 8:00 p.m. and 9:00 p.m. is 1.5 hours on the same Friday. Hence, the latency analysis system determines that the wait time for the restaurant is less—by 1.5 hours—for user devices arriving at 8:00 p.m. on Friday.

The latency analysis system 140 may also rely on historical latency-period data when making comparisons between two or more different points-of-interest. For example, the latency analysis system 140 may determine that one point-of-interest typically has shorter latency period on Sunday evenings as compared to other points-of-interest. The determined latency period at one grocery store, for example, may be 20 minutes at 5:00 p.m. on a Sunday, whereas the determined latency period for a nearby, second grocery store at the same time is 5 minutes. The latency analysis system 140 thus determines that the latency period for the second grocery store is 15 minutes less than the other grocery store by comparing the latency periods.

In other example embodiments, the latency analysis system 140 may compare the current latency periods for two or more points-of-interest, with or without relying on historical latency period data. For example, the latency analysis system 140 may compare the current or real-time latency period for two or more points-of-interest, such as two restaurants, at a defined time. In which case, the latency analysis system 140 may rely on current latency-period data rather than historical latency period data, for example. For example, the latency analysis system 140 may determine that one restaurant has a latency period that is 30 minutes longer than the latency period at a second, nearby restaurant. Hence, the latency analysis system 140 determines that the second restaurant as a shorter wait time.

In certain example embodiments, after accumulating latency-period data, the latency analysis system 140 may rely on additional factors when making a latency period determination for a point-of-interest. For example, in certain example embodiments, the latency analysis system 140 relies on historical latency period data when making real-time, latency-period determinations. If, for example, the latency analysis system 140 determines that a large number of user devices 110 are at a particular point-of-interest, such as a restaurant, compared to the usual (historical) number of users at the restaurant, the latency analysis system 140 may adjust or modify the determined latency period. For example, the latency analysis system 140 may determine that the latency period is longer than usual, regardless how long users (and their user devices) take to enter the restaurant and leave the restaurant. Alternatively, if the latency analysis system 140 determines that fewer than usual user devices 110 are at a point-of-interest, such as when fewer users 101 are in line to enter an amusement park, the latency analysis system 140 may reduce the latency period determination.

Similarly, the latency analysis system 140 may determine that significantly more users 101 with user devices 110 than usual are in the vicinity of a specific point-of-interest. For example, a large number of users as compared to the usual (historical) number of users 101 may be gathered at a theater that is adjacent to specific merchant system 130, such as a restaurant. Thus, the latency analysis system 140 may determine that the latency period is longer than usual—based on the number of users 101 in the vicinity—regardless how long users (and their user devices 110) take to enter the restaurant and leave the restaurant that is adjacent to the restaurant.

Based on the determined population of user devices 110 (and hence users 101) at or near the point-of-interest, the latency analysis system 140 may adjust or modify the determined latency period for the point-of-interest in certain example embodiments. That is, the latency analysis system may adjust or modify the latency period beyond the time determined for user devices 110 entering and exiting a point-of-interest. For example, if the latency analysis system 140 determines that the latency period is 2 hours at a specific restaurant, the latency analysis system may add an additional hour to the latency period to account for the additional users that are at an adjacent theater that are likely to go to the restaurant. Similarly, if more users 101 than usual—based on historical, latency-period data—are at (or arrive at) a specific grocery store, the latency analysis system may add addition time to the determined latency period beyond that determined for user devices entering and exiting the checkout line.

Alternatively, if a user population is much lower than usual at a specific point-of-interest, the latency analysis system 140 in certain example embodiments may decrease the determined latency period by a determined amount. For example, if fewer users 101 (and their devices 110) than usual are at an amusement park, the latency analysis system 140 may determine that lines at the amusement park should be shorter. The latency analysis system 140 may adjust or modify the determined latency period for the amusement park based on the lower population of present user devices 110. As those skilled in the art will appreciate, the latency analysis system 140 may account for various factors, such as user population, at or near a variety of points-of-interest.

Returning to FIG. 2, in block 215 of FIG. 2, the latency analysis system 140 receives a request from a user 101 regarding a point-of-interest. That is, a user 101 utilizes a user device 110 to communicate a request for which a latency period determination would be applicable, and the latency analysis system 140 receives the request. For example, the user device 110 communicates the request over the network 105. The request, for example, may include any content for which a latency period determination may be applicable. For example, a user 101 planning a trip to a grocery store may search for nearby grocery stores, such as on a user interface of a mapping application (not shown) on the user device 110. In other example embodiments, the latency analysis application 112 on the user device 110 may provide a user interface for the user 101 to search for or locate points-of-interest. The user 101 can enter point-of-interest information into the user interface, and the latency analysis system 140 receives the user's input.

For example, a user 101 may search for grocery stores that currently have the fastest checkout times. In certain other example embodiments, a user 101 desiring to eat at a specific restaurant may search for the restaurant on a user interface of the user device 110, in which case the wait-time at the restaurant may be responsive to the search of the user 101. Additionally or alternatively, the user 101 may search for restaurants generally, such as for restaurants that are nearby. A user 101 may also specifically request the wait time at the specific restaurant, for example. In certain example embodiments, the user 101 may seek the total experience time for one or more points-of-interest. For example, the user 101 may request the total time the user 101 will spend both traveling to a point-of-interest, such as a retailer, and then passing through the retailer, such as through the checkout line at the retailer. Likewise, the total experience time may include a round-trip time, such as the total time for a user to travel to a point-of-interest, pass through the point-of-interest, and return back to the original location of the user 101 (or to another specific location).

In certain other example embodiments, a user 101 may ask the latency analysis system 140, such as via the latency analysis application 112 on the user device 110, for the best time to go to a point-of-interest in order to avoid a wait. For example, the user 101 may ask the latency analysis system 140 what is the best time to go to a specific grocery store. The latency analysis system 140 then receives and processes the user's request. In certain other example embodiments, the user 101 may seek the total experience time it will take the user 101 to visit a point-of-interest, such as the time to travel to the point-of-interest and the time the user can expect to be at the point-of-interest. As one skilled in the art will appreciate, a user 101 may provide a variety of requests for which latency period information may be responsive.

In certain example embodiments, the user 101 may request a shopping route (or alternate shopping routes) for obtaining a list of products on a shopping list. For example, the user 101 may submit a shopping list to the latency analysis system 140, such as via a user interface of the latency analysis application 112, along with a request for a shopping route for obtaining the products on the shopping list. The user device 110 transmits the shopping list and the request to the latency analysis system 140, such as via the network 105, and the latency analysis system 140 receives the shopping list and the request. The latency analysis system 140 then processes the request as described herein.

In block 220, the latency analysis system 140 reads and processes user request. That is, the latency analysis system 140 determines the content of the request so that the latency analysis system 140 can determine whether providing latency-period information is applicable to the request of the user 101. For example, the latency analysis system 140 may determine that the request involves one or more points-of-interest, such as a merchant system 130, where providing latency-period information may be useful. By reading the request of the user 101, the latency analysis system 140 may determine, for example, that the request involves a nearby grocery stores, restaurants, or any other point (or points) of interest for which latency-period information may be applicable and hence likely useful to the user 101.

In block 225, after the latency analysis system 140 determines that the request of the user 101 contains content for which latency-period information might be applicable, the latency analysis system 140 determines latency-period information that is responsive to the request of the user 101.

That is, the latency analysis system 140 identifies the latency-period information that addresses the determined content of the request of the user 101.

For example, based on the content of the request, the latency analysis system 140 may determine that the user 101 is seeking nearby chain retailers. In response to such a request, the latency analysis system 140 determines, for example, the latency period for locations of the retailer near the user 101. For example, the latency analysis system 140 determines current latency period for one or more of the retailers that are within a configurable radius around the user device 110. In other example embodiments, the latency analysis system 140 may determine a total experience time for locations of the retailer near the user 101. For example, the latency analysis system 140 determines the latency-period information for one or more the retailers and then incorporates the latency-period information in to a total experience time determination.

In certain example embodiments, such as when the request of user 101 involves a real-time latency period determination, the latency analysis system 140 may perform an additional latency-period determinations in response to receiving and reading the request of the user 101. That is, in response to receiving a request, the latency analysis system 140 may determine that updated (or current) information is needed in response to the request. The latency analysis system 140 thus acquires the needed information in order to process the request of the user 101, such as by determining latency intervals for user devices 110 that are arriving at the destination that is the subject of the user's request. For example, if the latency analysis system 140 receives a request for a current wait time at a specific restaurant, the latency analysis system 140 may perform an additional latency-period determination in response to receiving and reading such a request. In other embodiments, such as when the latency analysis system 140 does not have any historical location data for a specific point-of-interest, the latency analysis system 140 may determine the latency period for the point-of-interest as described herein in response to receiving and reading the user's request. The latency analysis system 140 thus generates the latency period in response In block 230, the latency analysis system 140 communicates a response to the user 101 that incorporates a latency-period determination in to the response. That is, based on the determined latency-period information that is responsive to the request of the user 101, the latency analysis system 140 includes the responsive information in a communication to the user 101. For example, the latency analysis system 140 communicates the responsive latency period information to the latency analysis application 112 of the user device 110 via the network 105. The latency analysis application 112, for example, displays the responsive information to the user 101 via a user interface of the latency analysis application 112.

In an example embodiment, if a user 101 requests the wait time at a specific point-of-interest, such as a restaurant, the latency analysis system 140 will provide the expected wait time for the restaurant to the user 101 in a response to the user's request. If a user 101 makes a request that involves comparing different points-of-interest, for example, the latency analysis system will provide the comparative information to the user 101. For example, if a user 101 seeks to identify nearby restaurants and the associated wait time for each restaurant, the latency analysis system 140 will—in response to the request—identify the wait time at restaurants near the user device. The latency analysis system 140 will then communicate the wait times for the restaurants to the user 101 via the user device 110 of the user 101. Likewise, if a user 101 requests grocery stores nearby, the latency analysis system 140 can provide checkout times for various nearby grocery stores. The user then receives the communication on the user device of the user.

In certain example embodiments, such as when the request of the user 101 involves a total experience time determination, the latency analysis system 140 includes the total experience time in the communication to the user 101. For example, the latency analysis system 140 may couple the latency-period determinations with travel time to various points-of-interest. If the latency analysis system 140 receives a user request for nearby grocery stores, for example, the latency analysis system 140 may determine the checkout times for various grocery stores that are, for example, in a configurable radius around the user device 110. The latency analysis system 140 may also determine, such as by relying on travel-time determination from a location-based service provider, determine travel times to the grocery store. In other example embodiments, the latency analysis system 140, in conjunction with the user device and a location-based service, for example, determine travel times to and from the grocery store. The latency analysis system 140 can then include the travel time to one or more points-of-interest, such as nearby grocery stores, along with the latency period for the one or more grocery stores that are nearby. In such an example, the latency analysis system 140 provides the user 101 with a total experience time for the one or more grocery stores.

For example, in certain embodiments the latency analysis system 140 may identify five nearby grocery stores based on the current location of the user device 110, along with the checkout times at each grocery store. And, based on the latency-period information for each grocery store, the latency analysis system 140 may also make specific recommendations, such as a ranking the order of which grocery stores are faster on the whole. In other words, the latency analysis system 140 may inform the user 101, via the user device 110, that a grocery store that is further away is overall the fastest option because of shorter checkout times at the grocery store. The latency analysis system 140 can thus determine and provide a variety of responses that incorporate (or are based on) the latency-period data.

Based on the content of the request of the user 101, the latency analysis system 140 may provide qualitative or quantitative latency-period information to the user 101. For example, using the latency-period data, the latency analysis system 140 may inform a the user 101 that one point-of-interest has a qualitatively longer wait time than one or more other points-of-interest—without providing the actual amount of the wait time. Hence, the latency analysis system 140 provides a qualitative response to the user 101 via the user device 110. For example, the latency analysis system 140 may inform the user 101 that one retailer has checkout lines that are "faster" than another retailer's checkout line. Likewise, for a single point-of-interest, latency analysis system may inform a user 101 that certain times of the day are better than others for arriving at the point-of-interest, without providing quantitative information about the latency period.

In other example embodiments, the latency analysis system may inform the user that a particular point-of-interest has a longer wait time (quantitatively) than one or more other points-of-interest. For example, the latency analysis system 140 may inform the user 101 that a particular restaurant has a 20-minute wait, whereas two other nearby restaurants have a 10-minute wait time and a 5-minute wait time. In another example, the latency analysis system 140 combines latency-period information with estimated travel time information to provide a quantitative total time for the point-of-interest (a total experience time, as described herein). For example, if based on the latency-period data for a grocery store the latency analysis 140 system determines that the checkout time at a specific grocery store is 7 minutes—and the travel time to the grocery store is 13 minutes—the latency analysis system 140 may communicate a total time of 20 minutes to the user for the grocery store. The travel time, for example, may be a drive time, walk time, bicycling time, or other travel time that may be of interest to the user 101. In certain example embodiments, the latency analysis system 140 may determine the total experience for a plurality of points-of-interest.

Figure 4:
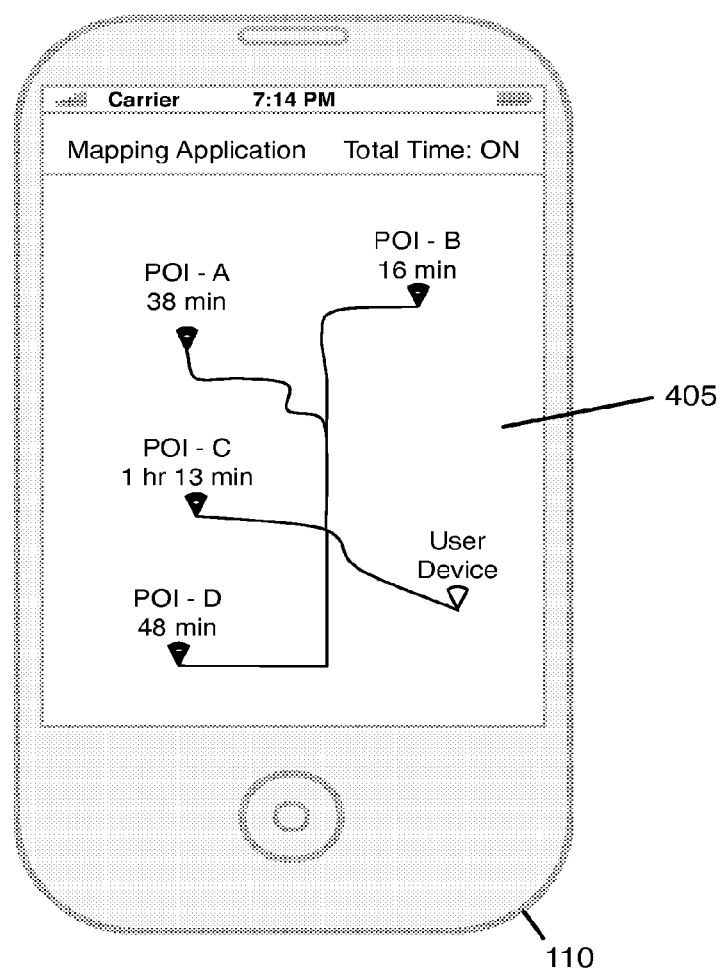
FIG. 4 is an illustration depicting a user interface for communicating a total experience time to a user for a plurality of points-of-interest, in accordance with certain example embodiments.

FIG. 4 is an illustration depicting a user interface for communicating a total experience time to a user for a plurality of points-of-interest, in accordance with certain example embodiments. For example, a user 101 searches for a nearby point-of-interest with either a mapping application (not shown) of the user device 110 or with another application, such as the latency analysis application 112, that communicates with the mapping application. When conducting the search, for example, the user 101 may select a setting, such as "Total Time: On" to indicate that the user 101 desires a total experience time determination for one or more points-of-interest. The point-of-interest can be any point-of-interest as described herein.

Based on the user's search, the latency analysis system 140 receives the request of the user 101 that involves a point-of-interest. The latency analysis system 140 determines the points-of-interest that are near the user device 110, such as all the points-of-interest in a configurable radius around the user device 110 that match the user's search. For example, the latency analysis system 140 may determine four points-of-interest near the user device 110. The latency analysis system 140 also determines the latency period at each point-of-interest. For example, for points-of-interest A, B, C, and D, the latency analysis system 140 may determine latency periods of 25 minutes, 1 minute, 1 hour and 5 minutes, and 38 minutes, respectively.

The latency analysis system 140 also retrieves or determines travel time to the identified points-of-interest. For example, the latency analysis system 140 may use or rely on travel times determined by the mapping application to determine the travel times to the point-of-interest. Continuing with the above example, for points-of-interest A, B, C, and D, the latency analysis system 140 may determine or obtain travel times of 13 minutes, 15 minutes, 8 minutes, and 10 minutes, respectively. The latency analysis system 140 then couples the travel time with the latency-period determinations for each of the identified points-of-interest, which results in a total experience time for the identified points-of-interest. For example, for point-of-interest A the total time would be 38 minutes (that is, 25 minutes latency time and 13 minutes of travel time). Similarly, the latency analysis system 140 would determine total experience times for points-of-interest B, C, and D of 16 minutes, 1 hour and 13 minutes, and 48 minutes, respectively. The latency analysis system 140 then communicates the total experience times to the user device 110, which informs the user 101 of the total experience times.

As shown in FIG. 4, for example, the latency analysis system 140 returns four points-of-interest to the user 101 via a user interface 405 of a mapping application. With the "Total Time: ON," for example, a total experience time is displayed for each of the four points-of-interest (points-of-interest A, B, C, and D) on the user interface 405. That is, the total time to travel to each point-of-interest, as combined with the latency period for each point-of-interest, is provided to the user 101 on the user interface 405. In the example user interface 405, although point-of-interest B is the furthest away, time-wise (15 minutes), point-of-interest B has the shortest total experience time (16 minutes). In contrast, point-of-interest C, which is the closest point-of-interest, time-wise (8 minutes), has the longest total experience time (1 hour and 13 minutes). Based on the information provided in the user interface 405 of the example in FIG. 4, a user 101 may thus chose to visit point-of-interest B over point-of-interest C. With the information that the latency analysis system 140 provides, such as the total time experience, a user 101 may choose to visit point-of-interest C based on travel time, while not knowing that the wait time or delay at point-of-interest C is over an hour.

Figure 5:
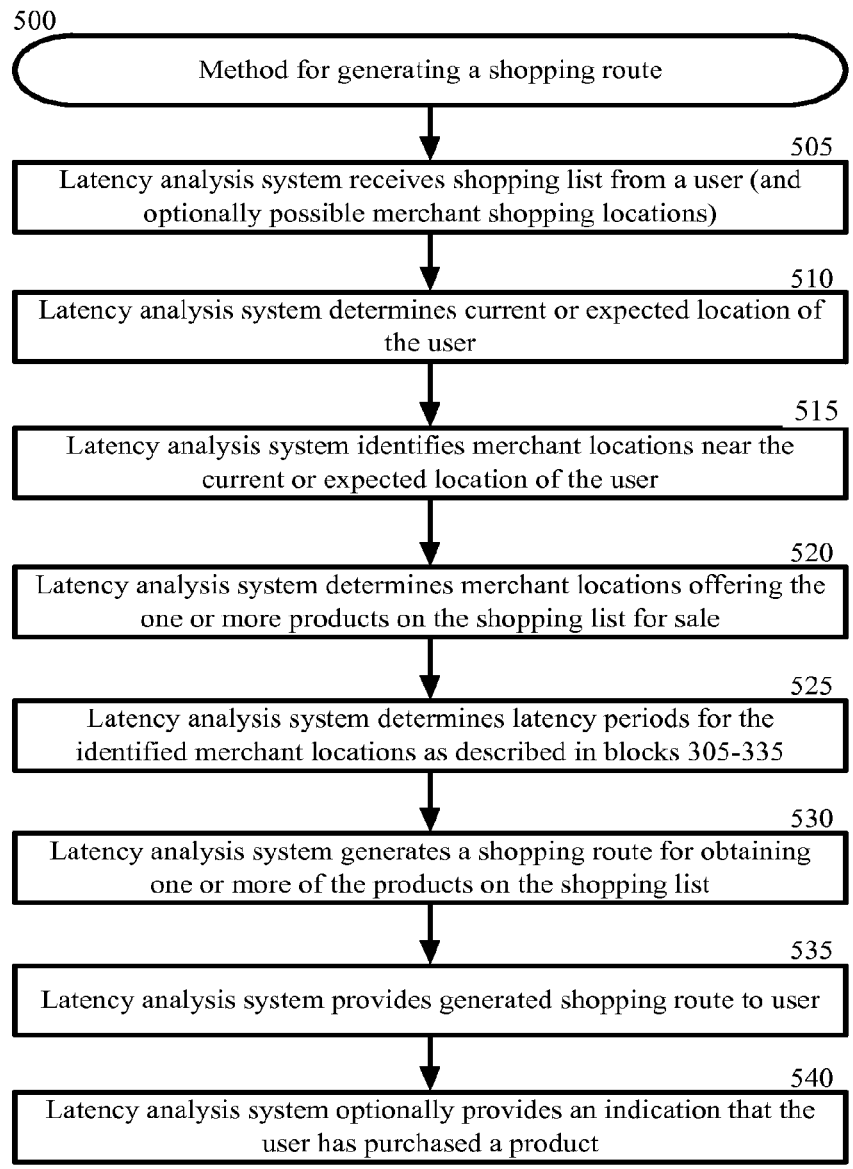
FIG. 5 is a block flow diagram depicting a method for generating a shopping route of a user, in accordance with certain example embodiments.

FIG. 5 is a block flow diagram depicting a method 500 for generating a shopping route of a user, in accordance with certain example embodiments.

With reference to FIGS. 1 and 2, in block 505, the latency analysis system 140 receives a shopping list from a user 101. The latency analysis system 140 also optionally receives possible merchant shopping locations for obtaining one or more products on the shopping list. For example, the latency analysis system application 112 may provide a user interface that allows the user 101 to input products of a shopping list in to the user device 110. Hence, as a user 101 determines products that the user 101 desires to purchase, the user 101 inputs the products in to the fields of the user interface on the user device 110. Additionally or alternatively, the user 101 may install a shopping list application (not shown) that provides the user 101 with a user interface to input products that the user 101 intends to purchase.

In certain example embodiments, the latency analysis system application 112 or a shopping list application may provide the user 101 with a user interface that contains fields where the user 101 can input merchant location information, such as preferred merchant location of the user 101, for obtaining one or more the user-identified products. For example, the user 101 may input ten products in to the product-input fields of a shopping list application of a user interface. The user 101 may also input a single merchant location of a merchant system 130, for example, such as where the user 101 expects to obtain each of the ten products. Alternatively, the user 101 may provide multiple merchant locations—such as different merchant locations—where the user 101 expects or prefers to obtain the ten products on the shopping list. For example, the user 101 may identify and input merchant A has having five of the ten products and merchant B as having the other five products. Hence, by identifying and inputting products and/or merchant locations where the products may be obtained, the user 101 creates a shopping list for the products.

In certain example embodiments, the user 101 may also input in to the user interface an origination location, such as an address, where the user 101 intends to begin a shopping trip. For example, a user 101 that desires to receive a shopping route as described herein may input a home address or other address, which can serve as the origin for determining the shopping route as described herein. That is, the address may serve as the origination location from which the user 101 intends to depart from when beginning the user's shopping trip. The origination location, for example, may or may not coincide with the current location of the user 101 (and the associated user device of the user 101). For example, the user 101 and the user's associated user device 110 may be located at a particular location, but the user 101 may desire to originate an shopping route from another location. A user 101 at a work location, for example, may desire to travel to the user's home after work and then thereafter originate the shopping route from the user's home. The user 101 may thus, in certain example embodiments, input an origination location for the shopping route, such as the user's home address, that is different from the current location of the user 101 (and the user device 110 of the user 101).

Alternatively, the user may indicate that the shopping route should originate at the current location of the user 101. That is, the origination location is the same as the user's current location. For example, the user interface of the user device 110 may include a user control option that allows the user 101 to select a "current location" or "present location" for originating the shopping route. Additionally or alternatively, the user 101 may provide an end location for the shopping trip. For example, a user 101 that desires to complete a shopping trip on the way home from the user's work location may indicate the user's work location as an origination location and the user's home as and end location for the shopping trip.

In certain examples embodiments, the user 101 may provide a departure time for the shopping trip. For example, the user 101 may indicate that the user 101 intends to depart for the shopping trip at the current time, such as by selecting a "depart now" user control option on a user interface of the user device 110. In certain examples embodiments, the user 101 may provide a future departure time, such as "leave in 2 hours" from the "current location." In certain example embodiments, the user 101 may provide—for an origination location that is different from the current location of the user 101—a future departure time from origination location. For example, a user 101 currently working at a work location may provide, via a user interface of the user device 110, a departure time of 6:00 p.m. from the home location of the user 101.

In certain example embodiments, the user 101 may also input into a user interface of the user device 110 a preferred mode or modes of transportation for the shopping route. For example, the user 101 may indicate that the user 101 is walking and/or traveling by personal transportation, such as by a car or bicycle of the user 101. Additionally or alternatively, the user may indicate a preference for public transportation, such as a public bus, ferry, and/or subway train that runs on predetermined routes and times. In certain example embodiments, the user 101 may indicate a combination of transportation options, such as walking, bicycling, and public transportation.

In certain example embodiments, the user 101 may indicate the maximum distance the user 101 desires to travel from the origination location of the shopping route. For example, the user 101 may indicate, such as via a user interface on the user device 110, that the user 101 desires only to travel within a specified radius of the origination location, such a radius of about 1, 2, 3, 4, 5, 6, 7, 8, 9, 10, 15, 20, 25, or 30 kilometers. In certain example embodiments, the user 101 may provide a total travel distance the user 101 is willing to travel. For example, the user 101 may indicate, such as via a user interface on the user device 110, that the user 101 desires to travel a total distance of about 1, 2, 3, 4, 5, 6, 7, 8, 9, 10, 15, 20, 25, or 30 kilometers to obtain all the items on the shopping list.

Following input of the products (and optionally merchant locations) in to fields of a user interface associated with the user device 110 to create the shopping list, the user device 110 communicates the shopping list to the latency analysis system 140. The latency analysis system 140 receives the shopping list (and optionally the locations where products on the list may be purchased). The latency analysis system 140 may also receive a user-provided origination location for the user 101, such as the location where the user 101 intends to begin (originate) the shopping route. The latency analysis system 140 may also receive the preferred means of transportation of the user 101 from the user device 110, as well as the maximum distance the user 101 will travel from the origination location and/or the desired total travel distance.

In certain example embodiments, the user 101 may provide or select user preferences for a shopping route that are then associated with the user account 143 of the user 101. For example, the user 101 may log in to the user account 143 and provide locations of merchants where the user 101 often shops. The user 101 may also provide or select other preferences with the user account 143, such as the preferred transportation means of the user 101, such bicycle, personal vehicles such a car, or public transportation. The user 101 may also indicate a maximum distance the user 101 is willing to travel beyond any origination location and/or for the total shopping trip. After receiving the preferences and selections of the user 101, the latency analysis system 140 associates the user's selections and preferences with the user account 143 of the user 101 for use in determining routes for the user 101.

In block 510, the latency analysis system 140 determines the current or expected location of the user 101. For example, based on receiving the shopping list from the user device 110, the latency analysis system 140 determines the current location of the user device 110 associated with the user 101 (and hence determines the location of the user 101). The latency analysis system 140 can determine the current location of the user device 110, for example, by any method described herein. For example, the latency analysis application 112 may, along with a location service and/or hardware of the user device 110, rely on WiFi signals and cellular communication towers to determine the location of the user device 110. Additionally or alternatively, the latency analysis application 112 may rely on satellites, Global Positioning System ("GPS") location technology, a Network Location Provider ("NLP"), a map application, or other location identifying technology of the user device 110 to determine location of the user device 110. Additionally or alternatively, the latency analysis system may rely on enhanced GPS systems and methods, such as those associated with a Differential Global Positioning System ("DGPS"). Additionally or alternatively, the latency analysis system may rely on indoor localization techniques.

In certain example embodiments, the latency analysis system 140 may determine the current location of the user 101 based on location information received from the user 101. For example, the user 101 may provide an origination location that coincides with the current location of the user 101 and the user device 110 associated with the user 101. The latency analysis system 140 then reads the received origination location to determine the current location of the user 101. Alternatively, the latency analysis system 140 may determine the expected origination location of the user 101 and the user device 110 associated with the user 101. For example, in embodiments where the user 101 and the user device 110 associated with the user 101 are different from the preferred origination location of the user 101, the latency analysis system 140 determines the expected location of the user 101 based on reading the received preferred origination location from the user device 110.

In block 515, the latency analysis system 140 identifies merchant locations near the user 101 or the expected origination location of the user 101. For example, based on the current location of the user device 110, the latency analysis system 140 determines merchant point-of-sale terminals 134 of one or more merchant systems 130 that are in the proximity of the user device 110 from which the latency analysis system 140 receives the shopping list of the user 101. Alternatively, such as when the latency analysis system 140 receives a preferred origination location from the user device 110 that is different from the current location of the user device 110, the latency analysis system 140 identifies merchant locations that are near (proximate) to the received origination location. To identify merchant locations, for example, the latency analysis system 140 may rely on received point-of-interest location data as described herein with reference to block 310. Additionally or alternatively, the latency analysis system 140 may rely on publically available information to identify merchant locations, such as merchant names and addresses.

In certain example embodiments, the latency analysis system 140 may identify merchant locations, such as merchant point-of-sale terminals 134, near the user device 110 or near a preferred origination location by defining a radius around the user device 110 or around the preferred origination location. For example, the latency analysis system may determine that merchant locations that are within the radius are near the user device 110 (or the preferred origination location), whereas merchant locations outside the radius are not near the user 101 device (or the preferred origination location). The radius may be any configurable length, for example, such as 1, 2, 3, 4, 5, 6, 7, 8, 9, 10, 15, 20, 25, or 30 kilometers, encompassing the current location of the user or the expected origination location. In certain example embodiments, the latency analysis system 140 may determine the length of the radius based on a preferred mode of transportation provided the user 101. For example, the radius encompassing merchant locations may be shorter if the user 101 is walking or bicycling to complete the shopping route, whereas the radius encompassing merchant locations near the user 101 (or the origination location) may be longer for a user 101 traveling by a motor vehicle. In certain example embodiments, the latency analysis system 140 may rely on radius information provided by the user 101 when identifying merchant locations.

In block 520, the latency analysis system 140 determines merchant locations offering the one or more products on the shopping list for sale. For example, after identifying merchant locations near the current or expected location of the user 101, the latency analysis system 140 may access record for the identified merchant location to determine which products the merchant offers for sale. The latency analysis system 140 then reads a product list record for the particular merchant location, for example, to identify products that match the one or more of the products on the received shopping list of the user 101.

If the latency analysis system 140 identifies a product match, for example, the latency analysis system 140 determines that the particular merchant location offers the product on the shopping list for sale. If the latency analysis system 140 does not identify a product match, the latency analysis system 140 may determine that the particular merchant location does not offer the product on the shopping list for sale. Alternatively, if the latency analysis system 140 does not identify a product match, the latency analysis system 140 may attempt to identify one or more the products on the shopping list by accessing the website 136 of the merchant system 130 and reading products that are offered "in store," for example. The latency analysis system 140 may additionally or alternatively request product information, such as for specific products on the shopping list, from the merchant system 130 for a particular merchant location, such as a particular point-of-sale terminal for the merchant system 130. The latency analysis system 140 may then attempt to determine product matches based on the products on the merchant website 136 and/or from information received from the merchant system 130.

In block 525, the latency analysis system 140 determines latency periods for the identified merchant locations as described in blocks 305-335. For example, for each of the identified merchants offering one or more of the products for sale, the latency analysis system 140 uses location history received from multiple users, for example, to determine latency intervals—and then the latency period (delay or wait-time)—at the merchant locations as described herein. In certain example embodiments, the latency analysis system 140 relies on historical latency period data to determine the latency period at each the locations, such as by accessing a record for the merchant that includes prior latency period information. For example, if a user 101 is currently departing the current location of the user 101 to begin the shopping trip, the latency analysis system 140 determines, using historical latency period date, the expected latency period for each identified merchant location based on the user's departure time. Additionally or alternatively, the latency analysis system 140 may determine a real time latency period for one or more of the merchant locations, based on the population of users 101 currently at a particular merchant location.

In certain example embodiments, when determining the latency period for the merchant locations, the latency analysis system 140 bases the latency period determination on when the latency analysis system 140 expects the user 101 to arrive at the merchant location. That is, the latency analysis system 140 may factor in the expected travel time to determine when the user 101 may arrive at a particular location, and hence determine the latency period for when the user 101 should arrive at the location. For example, if a user 101 provides a departure time of 1:00 p.m. from the user's current location, and the latency analysis system 140 identifies merchants A as offering all of the products on the user's shopping list for sale, the latency analysis system 140 may determine—based on the travel to merchant A—that the user 101 will arrive at merchant A at 1:15 p.m. Hence, the latency analysis system 140 can determine the latency period, for the particular merchant, for a user 101 arriving at 1:15.

In certain example embodiments, such as when visiting multiple merchant locations results in the most efficient (fastest) trip for the user 101, the latency analysis system 140 may base the latency period determinations on multiple expected arrival times. For example, the latency analysis system 140 may determine that a user 101 will arrive at merchant A at 1:15 p.m. as noted in the above example, and based on latency period data for merchant A at 1:15—may determine that the user 101 will spend 15 minutes at merchant location A before departing merchant A. The latency analysis system 140 may also determine that the user 101 will spend 20 minutes driving from merchant A to merchant B to obtain additional products. The latency analysis system 140 can thus determine that the user 101 will arrive at the merchant B location at 1:50 p.m. (that is, 25 minutes after arriving at merchant A). Hence, the latency analysis system 140 can determine a latency period for merchant B based on an arrival time of 1:50 p.m. for the user 101 at merchant B. To determine an expected arrival time, for example, the latency analysis system 140 may rely on the departure location of the user 101 relative to the destination location, the user's mode of transportation, routes the user 101 may travel, traffic congestion patterns associated with routes, and any other parameters that estimating an arrival time. Additionally or alternatively, the latency period determination may be based on a user-provided departure time that the latency analysis system 140 receives from the user 101. For example, at 12:00 p.m. a user 101 may indicate a desire to leave for a shopping trip at 1:00 p.m. the same day from the user's home. Hence, the latency analysis system 140 determines latency periods for merchant locations based on the user 101 departing at 1:00 p.m. from the user's home.

In block 530, the latency analysis system 140 determines a shopping route (or alternate shopping route) for obtaining one or more of the products on the shopping list. That is, based on the latency period determinations for the identified merchant locations offering the one or more products on the shopping list for sale, the latency analysis system 140 compares the determined latency periods for the merchant locations and determines the most efficient (shortest timewise) route for the user 101 to obtain the products on the shopping list. For example, based on the latency period determinations for merchant locations A, B, and C, the latency analysis system 140 may determine that—for merchant locations A, B, C, and D—the shortest route for the user 101 to obtain the products on the shopping list is to visit merchant B, then merchant C, then merchant A, and then merchant D. Alternatively, if all of the products on the shopping list can be collectively obtained at merchant locations A, B, and C, the latency analysis system 140 may determine a shopping route that includes only merchant locations A, B, and C (and not D)

To determine a shopping route (or alternate shopping route), the latency analysis system 140 analyzes the determined latency period for the merchant locations to determine which subset or combination of merchant locations results in the most efficient route, such as the quickest route. That is, the latency analysis system 140 compares the latency period data for each of the determined merchant locations offering the one or more products for sale to determine which subset or combination of merchant locations that—when visited—collectively results in the quickest or shortest route for the user 101 to obtain the products on the shopping list. For example, merchant location A and merchant location B may each offer the same product for sale. By comparing the latency period information for merchant A and merchant B, the latency analysis system 140 can determine which merchant (A or B) has a shorter latency period. The latency analysis system 140 can then include the merchant with the shortest latency period in the route determination for the user 101. By similarly comparing the latency periods for multiple merchant locations—and then relying on the shortest latency period among the determined merchant locations offering the products on the shopping list for sale—the latency analysis system 140 can determine and generate the route, such as the most efficient or optimized route, for the user 101 to obtain the products on the shopping list of the user 101.

As an example, if a user 101 identifies ten products on a shopping list, the latency analysis system 140 determines—after identifying merchant locations that offer each of the products for sale—which subset or combination of merchant locations the user 101 should visit to obtain the ten products. That is, based on the latency period data for each determined merchant location, the latency analysis system 140 determines the order the user 101 should visit each merchant location so that the amount of time the user spends in each location gathering products is minimized, and hence the overall length of the shopping trip to obtain the ten products is minimized. For example, the latency analysis system 140 may determine that three of the products on the shopping list of the user can be obtained at merchant A, while two of the products can be obtained at merchant B and the remaining products obtained at merchant C. Based on the determined latency period data for each of merchants A, B, and, C, the latency analysis system 140 may then determine that—if a user 101 leaves the current location of the user 101 at 1:00 p.m. to begin shopping—the user 101 will most efficiently obtain the ten products by first visiting merchant B, then merchant C, and then lastly merchant A. For example, the latency analysis system may determine that departing for a shopping trip at a current time of 1:00 p.m. and traveling to merchant B, C, and then A (in this order) may save the user 30 minutes when compared to departing at the same time (1:00 p.m.) and traveling merchant A, B, and then to merchant C.

In certain examples, when determining the shopping route for the user 101 to obtain the products on the shopping list of the user 101, the latency analysis system 140 couples the latency period data for the merchant locations with travel time for the shopping trip. That is, the latency analysis system 140 may include travel time to and from identified merchant locations as described herein when determining the generated shopping route. Hence, the generated shopping route is based on the total time to complete the shopping trip. For example, travel time alone may indicate a route where the user travels from merchant A to merchant B and then to merchant C to obtain the shopping list products, whereas latency period data alone may indicate that the user should travel to Merchant B, then merchant C, and then merchant A to obtain the products. Coupling latency period data with travel-time data, however, may result in a generated route, such as a faster route, where the user travels first to merchant A, then merchant C, then merchant B.

When coupling latency period data with travel-time data, the latency analysis system 140 may rely on a variety of modes of travel when determining travel time, including preferred modes of transportation that the user 101 has provided. For example, the latency analysis system 140 may rely on a user-provided walking time, bicycling time, or driving time, or combinations thereof. Additionally or alternatively, the latency analysis system 140 may rely on public transportation when determining and generating the shopping route, such as public buses, trains, subway trains, and/or ferry systems. Additionally or alternatively, the latency analysis system 140 may assume that the user 101 is walking or driving, for example, and hence base the latency period determination on a walking time or driving time. For example, if a user's shopping list includes a new toothbrush, a new pair of shoes, and a bicycle brake cable, the generated shopping route may include bicycling to merchant A to get the toothbrush, walking from merchant A to merchant B to get the shoes, and then taking a bus to merchant C to get the bike cable. The shopping route may also include taking the bus back to the user's end location.

In certain example embodiments, the latency analysis system 140 may determine and generate the shopping route based on preferences of the user 101, such as a user-provided or user-specified origination location, departure time, end location, or other preferences. For example, at 12:00 p.m. a user 101 may indicate a preferred departure time of 1:00 p.m. on the same day. Hence, based on latency period information determined for the departure time, the latency analysis system 140 can determine the shopping route for the user 101 based on the user 101 departing for the user's shopping trip at 1:00 p.m. That is, in certain example embodiments, the latency analysis system 140 determines the departure time for the user 101 based on the departure time received from the user 101.

Additionally or alternatively, the latency analysis system may determine and generate a shopping trip for the user 101 that includes the best or suggested departure time for the user 101. That is, in certain example embodiments, the latency analysis system 140 determines the best (or suggested) departure time for the user 101. For example, the latency analysis system may determine that departing at 2:00 p.m., instead of 1:00 p.m. on the same day—and traveling to merchant B, C, and then A—results in a faster overall route for the user to obtain the ten products. In certain example embodiments, the latency analysis system 140 may determine multiple departure times and routes associated with each departure time. For example, the latency analysis system 140 may determine the best or fastest route for obtaining the items on the shopping list based the user 101 departing at 1:00 p.m., 2:00 p.m., or 3:00 p.m. In such examples, the best or fastest route may be the same or different. In certain example embodiments, the latency analysis system 140 may determine that a specific day is preferred for completing the shopping trip. For example, the latency analysis system 140 may determine that completing the shopping trip on a Monday is more preferred (and faster) than completing the same shopping trip on a Sunday.

In certain examples, such as when the latency analysis system 140 receives a preferred merchant location from the user 101, the latency analysis system 140 may include the user-identified location in the route determination. That is, the latency analysis system 140 may determine that including one or more of the user-identified locations results in the generated route for the user to obtain the products on a shopping list. For example, the user 101 may identify merchant A as being a place where the user 101 preferred to shop. Thus, when generating the shopping route for the user 101, the latency analysis system 140 may include merchant A in the determined shopping route. Alternatively, the latency analysis system 140 may determine a shopping route excluding merchant A is the faster shopping route, while the route including the user-provided merchant A is slower. Hence, the latency analysis system 140 may determine two shopping routes for the user—one that includes the merchant A and one that does not include the merchant A, for example.

In certain example embodiments, the user 101 may provide several merchant locations. Hence, the latency analysis system 140 may determine a shopping route that includes only the merchant locations that the user 101 identifies. For example, a user 101 may identify merchant locations A, B, and C, and the latency analysis system 140 may determine a route that includes only A, B, and C. The latency analysis system 140 may also determine additional or alternative shopping routes that include one or more of the user-provided merchant locations. For example, the latency analysis system 140 may determine a shopping route that includes A, B, and D. In certain examples, the latency analysis system 140 may suggest merchant locations that are different than those the user 101 identifies.

In certain example embodiments, the efficiency of the generated shopping route may be limited based on received preferences of the user 101. That is, the generated shopping route may be the fastest shopping route for obtaining the products on the shopping list of the user 101 only when considering restrictions arising from preferences associated with the user 101. For example, the shortest route (time-wise) for obtaining the products the on the shopping list of the user 101 may include visits to merchants locations A, B, C, and D. Merchant location D, however, may lie outside the radius the user 101 is willing to travel or may result in a total trip length the user 101 is unwilling to travel. Hence, while visiting merchants locations A, B, C, and D may result in the fastest route for the user 101, the latency analysis system 140 may generate a route that includes visits to merchant locations A, B, C, and E (not D). In other words, when the latency analysis system 140 factors user preferences in to the shopping route determination, in certain example embodiments the shortest route (time-wise) for obtaining the products may be limited by the user 101 preferences (and hence less efficient than routes that ignore user preferences). In such embodiments, however, the latency analysis system 140 nevertheless generates a route for the user 101 to obtain the products. That is, if the latency analysis system 140 must configure the route to include preferences of the user 101, the latency analysis system 140 still provides the fastest route for obtaining the products in view of user preferences.

In certain example embodiments, the generated route may not include all the products on the shopping list. For example, if no merchant near the user 101 (or the user's origination location) offers the product for sale, the latency analysis system 140 may exclude the product when determining and generating the route. Alternatively, if obtaining a particular product results in a significantly less efficient (longer) shopping trip, the latency analysis system 140 may determine and generate two shopping routes—one that includes the particular product and one that excludes the particular product. That is, the latency analysis system 140 may determine multiple shopping routes that include all or a portion of the products on the shopping list of the user 101. In certain example embodiments, the latency analysis system 140 determines multiple or alternate shopping routes that, for each route, are based on the overall route time, the wait time at each merchant, and/or any user preferences. The multiple routes, for example, may include the same or different merchants.

In block 535, the latency analysis system 140 provides the generated shopping route to the user 101. That is, after determining a shopping route, the latency analysis system 140 communicates the generated shopping route to the user device 110 of the user 101 via the network 105. The user 101 then receives the route via the user device 110 of the user 101. In certain example embodiments, the latency analysis system 140 may communicate multiple shopping routes to the user 101 for the user 101 to choose from. For example, the latency analysis system 140 may communicate a ranked order of the most efficient (fastest) shopping routes to the user device 110 of the user 101, such as a list of different routes ranked from the faster route to the slower route. As an example, if a user 101 identifies a preferred merchant location for shopping—but the fastest route does not include the user-specified merchant location—the latency analysis system 140 may provide both the route excluding the user-identified location and a route including the user-specified location. In such embodiments, the latency analysis system 140 may identify which route is more efficient (faster), such as including the total amount of shopping time for the route. In certain example embodiments, the latency analysis system 140 provides multiple shopping routes that, for each route, include information regarding the overall route time, the wait time at each merchant, and/or any information regarding user preferences. The multiple routes, for example, may include the same or different merchants.

In block 540, the latency analysis system 140 optionally provides an indication that the user has purchased a product. That is, as the user 101 purchases products on the shopping list, the user may "check off" the purchased products. For example, the latency analysis system 140 may provide the user with a user interface on the user device that presents the list of products. As the user 101 purchases the products, the user 101 may select the product, such as by a "tap," "click," or "swipe" of the product. The user interface can then provide an indication that the user 101 purchased the product, such as placing a check mark by the product on the list, highlighting the product, or removing the product from the list. The user 101 can then determine from the user interface that the product has been purchased.

In certain example embodiments, the latency analysis system 140 may automatically "check off" products that the user 101 purchases after the user 101 purchases the products. That is, after a user 101 leaves a merchant location on the generated shopping route, the latency analysis system 140 may assume that the user 101 has obtained the products associated with the merchant location. The latency analysis system 140 then provides an indication on the user interface of the user device 110 that the product has been purchased, such as by placing a check mark by the product on the list, highlighting the product, or removing the product from the list.

Additionally or alternatively, the latency analysis system 140 may confirm that the user 101 in fact purchased the product or products associated with the merchant, such as by reading purchase transaction information associated with a digital wallet of the user 101. That is, as the user 101 makes purchases with a financial account associated with the user account 143 of the user 101, such as a digital wallet account of the user 101, the latency analysis system 140 receives purchase transaction information regarding the purchases. The latency analysis system 140 then reads the information to determine the products that the user 101 has purchased. In certain example embodiments, the latency analysis system 140 may also determines from the purchase transaction information the identity of the merchant selling the product. Additionally or alternatively, the latency analysis system 140 determines the location of the merchant based the location of the user device 110 at the merchant location on the shopping route. After the latency analysis system 140 confirms the purchased products at a particular merchant location, the latency analysis system 140 automatically "checks off" the products on the shopping list. For example, the latency analysis system 140 provides an indication on the user interface of the user device 110 that the product has been purchased, such as by placing a check mark by the product on the list, highlighting the product, or removing the product from the list.

FIGS. 6A through 6D are an illustration depicting a user interface for providing a shopping route to a user, in accordance with certain example embodiments.

As shown in FIG. 6A, a user 101 inputs in to a user interface 605 of a user device 110, such as a user interface the latency analysis application 112, a shopping list of products that the user 101 intends to purchase. As shown, the user 101 can input multiple products in to the user interface 605. After the user 101 inputs the products, for example, the user 101 may select a user control option, such as an "enter" or "submit list" option, to transmit the shopping list to the latency analysis system 140. When the user selects "submit list," for example, the user interface on the user device 110 transitions to a user interface 605 where the user 101 can input additional information for the shopping trip, such as preferences of the user 101, as shown in FIG. 6B.

For example, the user 101 inputs the user's "current location" as both the user's origination location and end location for the generated shopping route. The user 101 also selects total time "on," for example, thus indicating that total time—including travel time and time at each merchant location of the shopping trip—should be included in the shopping route. That is, the user 101 desires the shortest total time to complete the shopping route. The user also provides a future departure time of 1:15 p.m. for the shopping trip. The user 101 may also enter the maximum distance the user 101 is willing to travel from the origination location, such as "10 km." The user 101 may also enter the name of one or more preferred merchant locations, such as "merchant A," as well as the preferred mode of transportation, such as "Walking & Bicycle." The user 101 may also be provided with a "more preferences" option control button. After the user 101 inputs the information in to the user interface of the user device 110, the user device 110 communicates the information to the latency analysis system 140 via the network 101, for example, and the latency analysis system 140 receives the information from the user device 110.

After receiving the user-provided information from the user device 110, the latency analysis system 140 generates a shopping route for the user as described herein and provides the route to the user 101. That is, taking in to consideration the user-provided information—such as the user shopping list and the user preferences as illustrated in FIGS. 6A and 6B—the latency analysis system 140 determines the location of the user 101, identifies merchant locations near the user 101 offering products on the shopping list for sale, determines the latency periods for the merchant locations, and determines and generates a shopping route for the user 101 to obtain the products on the shopping list. The latency analysis system 140 then communicates the shopping route (or multiple routes) to the user device 110, such as via the network 105. In certain example embodiments, the latency analysis system 140 transmits a ranked order of shopping routes to the user device 110, such as list of fastest routes to slower routes.

As shown in FIG. 6C, after the user device 110 receives the ranked order of shopping routes from the latency analysis system 140, the user interface 605 of the user device 110 presents the shopping routes to the user 101. For example, the latency analysis system 140, such as via the latency analysis application 112, generates and provides six "shopping routes" to the user 101, of which routes three through six include "merchant A" as the user 101 requested in FIG. 6B. In the example shown in FIG. 6C, however, the first two routes—which do not include merchant A—are more efficient that routes three to six. Route three, for example, totals 47 minutes and includes "merchant A," whereas routes one and two exclude "merchant A" yet total 38 minutes and 42 minutes, respectively. The user interface 605 may also present trip order information. For example, while route 3 involves visiting merchant A and then merchant B, route 4—which at 53 minutes is slightly less fast than route three—involves visiting merchant B and then merchant A. And as also shown in FIG. 6C, visiting three merchants, such as combinations of merchants A, B, and C, results in even less efficient routes, for example, and includes traveling by car. In certain example embodiments, such as illustrated in FIG. 6C, the user interface 605 may also provide the user 101 with a user control button for selecting "additional routes." Additionally or alternatively, the user interface 605 may provide the user 101 with a user control button for selecting "tips for faster route." When selected, such tips may inform the user 101 the selecting specific merchant locations to conduct shopping—or placing travel distance restrictions on the route—may make the routes less efficient (that is, less fast or slower).

As shown in FIG. 6D, if the user selects route 3, the user interface 605 presents the user 101 with the selected route that, in this example, includes merchant A and merchant B and travel by bicycle. For example, the latency analysis application 112 may present a total time of 47 minutes to the user 101. The route may include additional information regarding times associated with the route. For example, based on the determined latency period information and the expected arrival time at each of merchant A and B, the user interface 605 of the latency analysis application 112 indicates that 10 minutes will be spent at merchant A and that 16 minutes will be spent at merchant B with the selected shopping route. The user interface 605 also indicates, in certain example embodiments, the travel time and specific route information. For example, the travel time along the bicycle route from the current location of the user 101 to merchant A is 6 minutes, from merchant A to merchant B is 5 minutes, and from merchant B back to the current location of the user 101 is 10 minutes. Hence, the total time—which includes the latency period time for each of merchant A and merchant B and the travel time—is 47 minutes in total.

Other Example Embodiments

Figure 7:
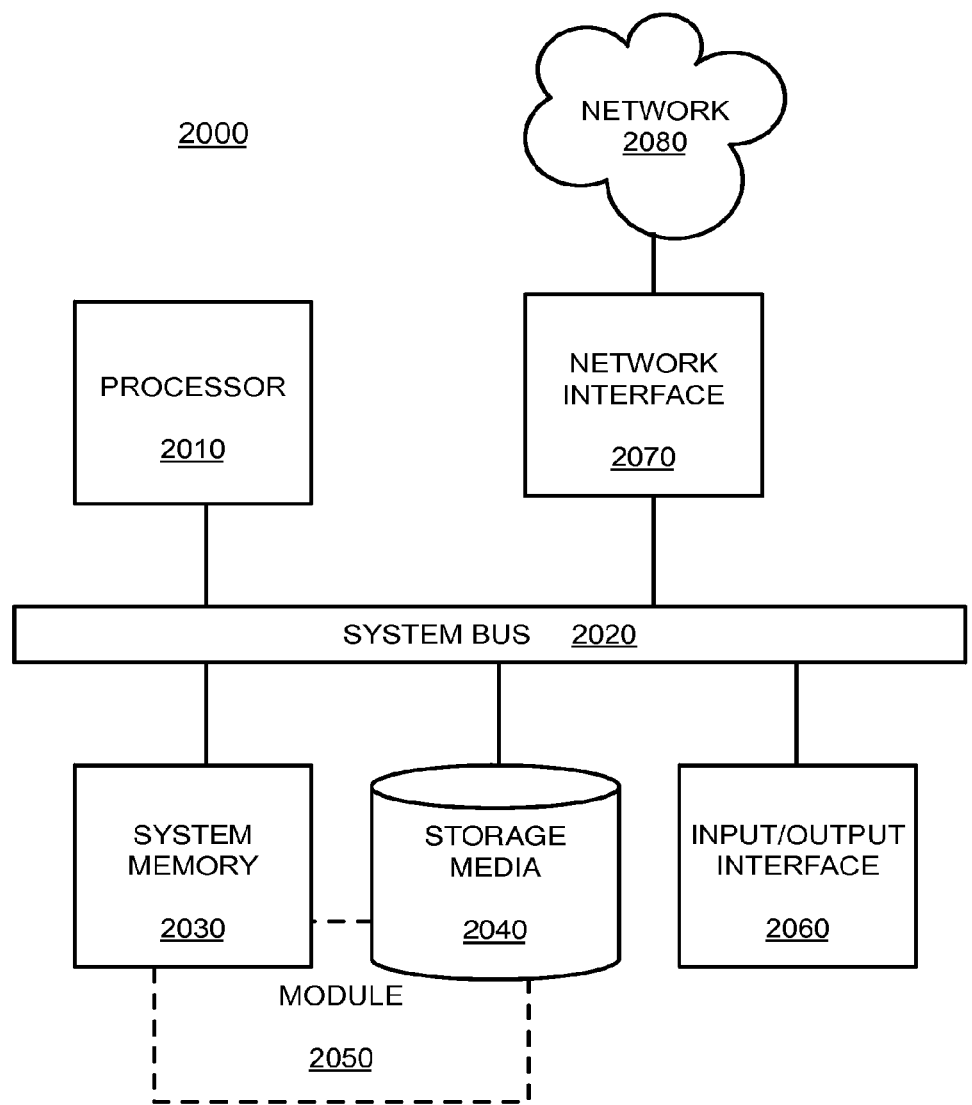
FIG. 7 is a block diagram depicting a computing machine and a module, in accordance with certain example embodiments.

FIG. 7 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain example embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the examples described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method for latency determination, comprising, by one or more computing devices:
   receiving a list from a first user computing device, wherein the list comprises a plurality of items;
   determining a latency period for each of a plurality of point of interest locations at which one or more of the items is available, wherein determining the latency period for each point of interest location comprises:
      receiving fine-grained location data for a plurality of second user computing devices, wherein the fine-grained location data comprises information identifying a plurality of locations for each of the plurality of second user computing devices and a corresponding time at which each of the plurality of user computing devices was at each location;
      determining, for each second user computing device, a latency interval for the point of interest location comprising an amount of time that elapses between a first time at which the fine-grained location data indicates that the second user computing device arrives at a queue and a second time at which the fine-grained location data indicates that the second user computing device leaves the queue, the queue comprising a particular area within an area comprising the point of interest location;
      identifying, based on the determined latency intervals, a latency period for the particular point of interest location;
   determining, in response to determining the latency period for each of the determined point of interest locations, a route identifying at least a portion of the point of interest locations at which one or more of the plurality of items on the list is available; and
   transmitting, to the first user computing device, the route identifying at least a portion of the point of interest locations at which one or more of the plurality of items on the list is available causing the first user computing device to display the route.

2. The computer-implemented method of claim 1, further comprising determining, by the one or more computing devices, a location of the first user computing device relative to a location for each of the one or more point of interest locations at which one or more of the items is available, wherein determining the location of the first user computing device relative to the location of the plurality of point of interest locations comprises determining, by the one or more computing devices, point of interest locations at which one or more of the items are available that are within a defined radius encompassing the first user computing device.

3. The computer-implemented method of claim 2, wherein one or more of the point of interest locations within the defined radius encompassing the first user computer device are identified by a first user associated with the first user computing device.

4. The computer-implemented method of claim 2, further comprising, determining, by the one or more computing devices, a departure time for a first user associated with the first user computing device to begin the route.

5. The computer-implemented method of claim 1, wherein determining a route identifying at least a portion of the point of interest locations at which one or more items on the list can be acquired comprises determining, by the one or more computing devices, a travel time associated with each of the point of interest locations identified in the route.

6. The computer-implemented method of claim 5, further comprising, determining a total experience time for a first user associated with the first user computing device to complete the route, the total experience time determined based on the travel time associated with each of the point of interest locations and the latency period for each of the identified point of interest locations of the route.

7. The computer-implemented method of claim 6, wherein determining the route further comprises ordering the point of interest locations at which one or more of the items can be acquired to minimize the total experience time.

8. The computer-implemented method of claim 1, further comprising receiving, by the one or more computing devices, an indication that a first user associated with the first user computing device has acquired one or more of the items on the list.

9. The computer-implemented method of claim 1, wherein one or more of the plurality of items on the list comprise an item that can be purchased.

10. A system for latency period determination, comprising:
   a storage device;
   a processor communicatively coupled to the storage device, wherein the processor executes application code instructions that are stored in the storage device to cause the system to:
      receive a list from a first user computing device, wherein the list comprises a plurality of items;
      determine a latency period for each of a plurality of point of interest locations at which one or more of the items can be acquired, wherein determining the latency period for each point of interest location comprises:
         receiving fine-grained location data for a plurality of second user computing devices, wherein the fine-grained location data comprises information identifying a plurality of locations for each of the plurality of second user computing devices and a corresponding time at which each of the plurality of user computing devices was at each location;
         determining, for each second user computing device, a latency interval for the point of interest location comprising an amount of time that elapses between a first time at which the fine-grained location data indicates that the second user computing device arrives at a queue and a second time at which the fine-grained location data indicates that the second user computing device leaves the queue, the queue comprising a particular area within an area comprising the point of interest location;
         identifying, based on the determined latency intervals, a latency period for the particular point of interest location; and determine, in response to determining the latency period for each of the determined point of interest locations, a route identifying at least a portion of the point of interest locations at which the one or more items is available.

11. The system of claim 10, wherein the processor is further configured to execute application code instructions that are stored in the storage device to cause the system to determine a departure time for a first user associated with the first user computing device to begin the route.

12. The system of claim 10, wherein the processor is further configured to execute application code instructions that are stored in the storage device to cause the system to determine a total experience time for the route, the total experience time determined based on the travel time associated with each of the point of interest locations and the latency period for each of the identified point of interest locations of the route.

13. The computer-implemented method of claim 12, wherein determining the route further comprises ordering the point of interest locations to minimize the total experience time.

14. The system of claim 10, wherein one or more of the plurality of items on the list comprise an item that can be purchased.

15. A non-transitory computer-readable storage medium having computer-executable program instructions embodied thereon that when executed by a computer cause the computer to:
a non-transitory computer-readable storage medium having computer-executable program instructions embodied thereon that when executed by a computer cause the computer to:
receive a list from a first user computing device, wherein the list comprises a plurality of items;
determine a latency period for each of a plurality of point of interest locations offering at which one or more of the items can be acquired, wherein determining the latency period for each point of interest location comprises:
receiving fine-grained location data for a plurality of second user computing devices, wherein the fine-grained location data comprises information identifying a plurality of locations for each of the plurality of second user computing devices and a corresponding time at which each of the plurality of user computing devices was at each location;
determining, for each second user computing device, a latency interval for the point of interest location comprising the amount of time that elapses between a first time at which the fine-grained location data indicates that second user computing device arrives at a queue and a second time at which the fine-grained location data indicates that second user computing device leaves the queue, the queue comprising a particular area within an area comprising the point of interest location; and
identifying, based on the determined latency intervals, a latency period for the particular point of interest location; and
determine, in response to determining the latency period for each of the determined point of interest locations, a route identifying at least a portion of the point of interest locations at which one or more of the plurality of items on the list is available.

16. The non-transitory computer-readable storage medium of claim 15, further comprising computer-executable program instructions embodied thereon that when executed by the computer cause the computer to provide the route to the first user computing device, wherein the route is displayed on the first user computing device.

17. The non-transitory computer-readable storage medium of claim 15, further comprising computer-executable program instructions embodied thereon that when executed by the computer cause the computer to determine a total experience time for the route, the total experience time determined based on the travel time associated with each of the point of interest locations and the latency period for each of the identified point of interest locations of the route.

18. The non-transitory computer-readable storage medium of claim 15 wherein one or more of the plurality of items on the list comprise an item that can be purchased.

* * * * *

UNITED STATES PATENT AND TRADEMARK OFFICE
CERTIFICATE OF CORRECTION

PATENT NO. : 10,436,596 B2
APPLICATION NO. : 15/236373
DATED : October 8, 2019
INVENTOR(S) : Dean Kenneth Jackson and Daniel Victor Klein Page 1 of 1

It is certified that error appears in the above-identified patent and that said Letters Patent is hereby corrected as shown below:

In the Claims

Column 45, Claim 15, Lines 30-33, delete "a non-transitory computer-readable storage medium having computer-executable program instructions embodied thereon that when executed by a computer cause the computer to:"

Signed and Sealed this
Twenty-fourth Day of December, 2019

Andrei Iancu
*Director of the United States Patent and Trademark Office*